United States Patent [19]
Kaschke et al.

[11] Patent Number: 5,956,626
[45] Date of Patent: Sep. 21, 1999

[54] WIRELESS COMMUNICATION DEVICE HAVING AN ELECTROMAGNETIC WAVE PROXIMITY SENSOR

[75] Inventors: Kevin D. Kaschke, Hoffman Estates; Matthew Duane Mottier; Paul John Moller, both of Lake Zurich, all of Ill.

[73] Assignee: Motorola, Inc., Schuamburg, Ill.

[21] Appl. No.: 08/656,823

[22] Filed: Jun. 3, 1996

[51] Int. Cl.$^6$ .................................................. H04B 17/00
[52] U.S. Cl. ........................ 455/115; 455/126; 340/552
[58] Field of Search ............................. 455/91, 115, 117, 455/126, 128, 129, 347–351, 254, 255, 265, 317; 340/552, 553

[56] References Cited

U.S. PATENT DOCUMENTS

| | | |
|---|---|---|
| 3,173,091 | 3/1965 | Strull . |
| 3,403,335 | 9/1968 | Couper et al. . |
| 4,173,755 | 11/1979 | Butler . |
| 4,237,448 | 12/1980 | Weinberg . |
| 4,313,118 | 1/1982 | Calvin . |
| 4,439,734 | 3/1984 | Weber . |
| 4,475,089 | 10/1984 | Kahnke . |
| 4,536,761 | 8/1985 | Tsunoda et al. . |
| 4,652,864 | 3/1987 | Calvin . |
| 4,727,337 | 2/1988 | Jason .................................... 455/117 X |
| 4,845,422 | 7/1989 | Damon . |
| 4,862,061 | 8/1989 | Damon . |
| 4,868,488 | 9/1989 | Schmall . |
| 4,871,997 | 10/1989 | Adriaenssens et al. . |
| 4,879,759 | 11/1989 | Matsumoto et al. . |
| 4,904,992 | 2/1990 | Grothause . |
| 4,918,438 | 4/1990 | Yamasaki . |
| 5,097,227 | 3/1992 | Yuan et al. . |
| 5,109,545 | 4/1992 | Schiller et al. ........................ 455/317 |
| 5,124,954 | 6/1992 | Hordijk . |
| 5,189,389 | 2/1993 | DeLuca et al. . |
| 5,227,667 | 7/1993 | Takinami et al. . |
| 5,227,764 | 7/1993 | Umemoto ................................ 340/552 |
| 5,542,105 | 7/1996 | Finch et al. .......................... 455/351 X |

FOREIGN PATENT DOCUMENTS 4-56533  2/1992  Japan .

OTHER PUBLICATIONS

"Audible Message Alert With Ear Proximity Detector For Portable Handsets," by Robert Louis Breeden Motorola, Inc., Technical Developments, vol. 12, Apr. 1991, pp. 102–103.

"Vibrator (Silent) Alert Revert To Audible Option Using Motion Sensor," by Dan Larson, Motorola, Technical Developments, vol. 14, Dec. 1991, p. 60.

*Primary Examiner*—Thanh Congle
*Attorney, Agent, or Firm*—Kevin D. Kaschke

[57] ABSTRACT

A wireless communication device (101), such as a radiotelephone or a pager, comprises a signal generator (200), a radiator (202), a sensor (204) and a controller (206) to form an electromagnetic wave proximity sensor (201). The signal generator (200) generates a signal (210). The radiator (202) radiates the signal (210) to produce an electromagnetic field (212) near the radiator (202). The electromagnetic field (212) changes by a predetermined amount responsive to the proximity (214) of the radiator (202) to a predetermined object (216), such as a human body (232), external to the wireless communication device (101). The sensor (204) provides an indication (218) of the predetermined amount of change in the electromagnetic field (212). The controller (206) controls circuitry (208), such as a tactile alert device (416) and an audible alert device (418), in the wireless communication device (101) responsive to the indication (218) of the predetermined amount of change in the electromagnetic field (212).

123 Claims, 7 Drawing Sheets

WIRELESS COMMUNICATION DEVICE HAVING AN ELECTROMAGNETIC WAVE PROXIMITY SENSOR

FIELD OF THE INVENTION

The present invention relates generally to wireless communication devices and, more particularly, to a wireless communication device having an electromagnetic wave proximity sensor.

BACKGROUND OF THE INVENTION

A wireless communication device operates in a wireless communication system to provide a user of the device with portable communications. A wireless communication device communicates with the wireless communication system or other wireless communication devices via electromagnetic signals, such as those in the radio frequency (RF) range, for example. The wireless communication device may communicate voice only, data only or both voice and data. The format of the electromagnetic signal communicated between the wireless communication device and the wireless communication system or other devices may be either analog or digital. Examples of wireless communication devices comprise radiotelephones, pagers, one-way radios, two-way radios, personal data assistants, and personal notebooks. The radiotelephones comprise cellular and cordless subscriber units. A cellular radiotelephone system forming the wireless communication system, for example, is described in EIA/TIA INTERIM STANDARD, Cellular System Dual-Mode Mobile Station-Base Station Compatibility Standard, IS-54-B, Telecommunications Industry Association, April 92.

Wireless communication devices use various alert techniques to indicate to a user of a wireless communication device that an incoming desired signal has been received. For example, a radiotelephone alerts the user when an incoming call signal is received, and a pager alerts the user when an incoming page signal is received. Generally, these alert techniques include audible, visual and tactile alert generators. The audible alert generator is typically implemented with an acoustic transducer, i.e. a speaker, sometimes known as a ringer. The visual alert generator is typically implemented with a display or a separate indicator. The tactile alert generator is typically implemented with an axially offset counter-weight driven by a motor to cause a vibrating sensation.

Audible alert generators are generally known in virtually all wireless communication devices. When a desired signal has been received, the wireless communication device activates the audible alert generator to produce a sound, such as a ring or beep, thereby alerting the user. A problem with audible alert generators is that the sound produced can be disturbing to others in environments where there is a low ambient noise level, and may not be heard by the user in environments where there is a high ambient noise level.

Visual alert generators are generally known in most wireless communication devices. When a desired signal has been received, the wireless communication device activates the visual alert generator to produce a visual indicator, such as a flashing icon in the display or a flashing light, thereby alerting the user. A problem with visual alert generators is that the visual indicator produced can go undetected by the user for some period of time until the user actually looks at the visual indicator. Therefore, the audible alert generator is typically used as a primary alert and the visual alert generator is typically used as a secondary or redundant alert.

Tactile alert generators are generally known in only some wireless communication devices. Tactile alert generators are typically used in wireless communication devices that are small enough to be portable and worn on the user such that the tactile sensation is felt. Some pagers and radiotelephones, for example, have the motor driving the axially offset counter-weight to produce a vibrating sensation against the user. When a desired signal has been received, the wireless communication device activates the tactile alert generator to produce a tactile sensation, such as vibration, thereby alerting the user. A problem with tactile alert generators is that the tactile sensation produced can go undetected by the user when the wireless communication device is not worn by the user or closely coupled to the user in some manner. Therefore, the tactile alert generator is typically used in environments where the ambient noise level is very low such that others in the area are not disturbed or environments where the ambient noise level very high such that the user is alerted when the audible alert cannot be heard.

U.S. Pat. No. 4,918,438 discloses a paging receiver for receiving a paging signal. When the paging signal is received, the paging receiver drives one of a tactile and audible alert for a first predetermined period of time, and automatically drives the other alert for a second period of time on lapse of the first predetermined period of time. Therefore, the paging receiver drives the alerts automatically and sequentially regardless of whether the paging receiver is on the user. However, operating this paging receiver independent of its location relative to the user has disadvantages. First, if the paging receiver drives the tactile alert before the audible alert and the paging receiver is not on the user, the user is not alerted until the audible alert is generated during the second predetermined period of time. In a radiotelephone application, a calling party or the radiotelephone system may terminate a call during the first predetermined period of time before the paging receiver drives audible alert. Second, if the paging receiver drives the audible alert before the tactile alert, the audible alert may disturb others is in a quiet environment.

U.S. Pat. No. 5,189,389 discloses a paging receiver having an alert mode sensor for determining when the paging receiver is on and off a user. When the paging receiver activates a first alerting device when the paging receiver is determined to be on the user and activates a second alerting device when the paging receiver is determined to be off the user. The alert mode sensor senses the position of a belt clip on the paging receiver or the position of the paging receiver in a battery charger.

A motion sensor for a pager, disclosed in Motorola Technical Publication, volume 14, page 60, December 1991, causes a silent (e.g. vibrator) alert device to be activated when motion of the pager is detected and causes an audible alert device to be activated when no motion of the pager is detected.

A capacitance sensor or an infrared sensor for a radiotelephone handset, disclosed in Motorola Technical Publication, volume 12, pages 102–103, April 1991, determines the location of the radiotelephone handset relative to a user and controls circuitry in the radiotelephone handset responsive to the determined location.

Other types of proximity sensors include eddy-current sensors, variable reluctance sensors, Hall-effect sensors, reed switch sensors, reflective optical sensors, metal detecting sensors, and microwave sensors.

The eddy-current sensors are limited to applications that rely on a very large change in field disturbance to kill an oscillator. A killed oscillator circuit requires a large change in reactance. Therefore, the size of a detected object needs to be large thereby yielding a coarse resolution system.

The variable reluctance sensors, are typically used to sense a toothed or binarily arranged, metallic wheel for sensing rotary position or speed.

Hall-effect sensors detect a change in a polarity of a magnetic field. Therefore, a target is limited to a magnetic material. Hall-effect sensors are sensitive to a gap between the target and the sensor and typically have a limited temperature operating range.

Reed switch sensors detect a change in a magnetic field. Therefore, a target is limited to a magnetic material.

Reflective optical sensors are generally fragile, are limited to a medium temperature range, have a medium resolution, and need a relatively clean environment to operate reliably.

Metal detecting sensors typically detect a shift in an oscillator frequency. They are typically used to detect large targets introduced into a radiating field based on a change in inductance attributable to permitivity, or permeability due to a permeable target intruding this field. This type of sensor technology requires a relatively large target needed to significantly shift the oscillator frequency.

Microwave sensors include those that work on a Doppler shift principle and those that work on a gross change in reactance. The Doppler shift type sensors are normally used to measure the speed of a passing object. Although they may be adapted in a one or two-state encoders they are relatively more expensive and complex than other, simpler approaches. The second type of microwave based sensors looks for a major change in an oscillator's reactive field by introducing a reactive target within the field thereby killing or starting the oscillator. This scheme is typically limited to sensing large changes in reactance.

Accordingly, there is a need for a wireless communication device having an electromagnetic wave proximity sensor which overcomes the disadvantages of the prior art.

DETAILED DESCRIPTION OF A PREFERRED EMBODIMENT

Figure 1:
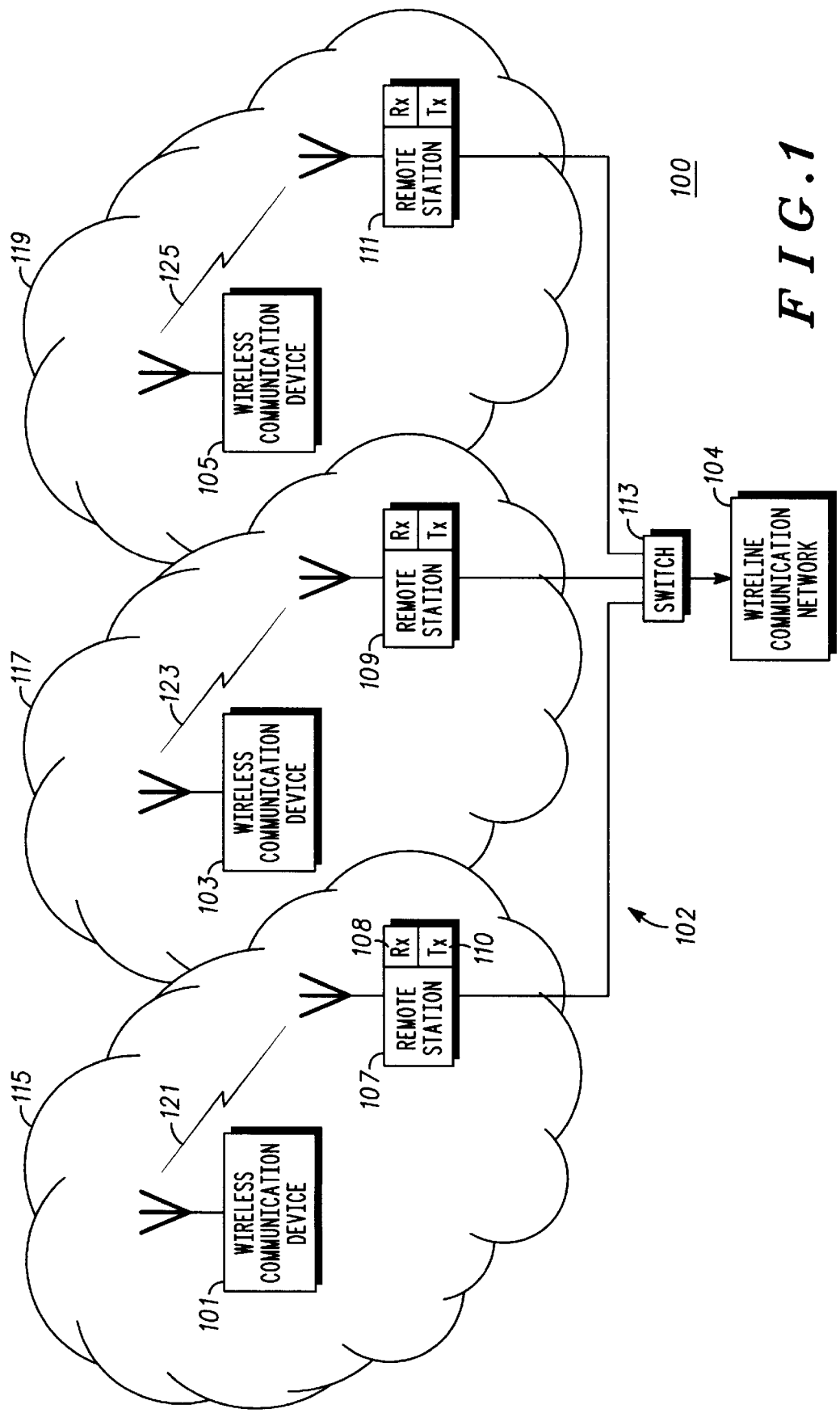
FIG. 1 illustrates a block diagram of a communication system for use in accordance with the present invention.

FIG. 1 is a block diagram of a communication system 100 for use in accordance with a the present invention. The communication system of FIG. 1 generally comprises a wireless communication system 102 coupled to a wireline communication system 104. The wireless communication system 102 generally comprises a switch 113 coupled to a plurality of remote stations 107, 109 and 111, and a plurality of wireless communication devices 101, 103 and 105. The communication system 100 provides communications between the wireline communication system 104 and one or more wireless communication devices 101, 103 and 105, or among the wireless communication devices 101, 103 and 105 in the wireless communication network 102.

In the preferred embodiment of the present invention, the wireline communication network 104 is a public switched telephone network. Generally, the remote stations 107, 109 and 111, the switch 113 and the wireline communication network 104 are individually well known in the art, and hence no additional description is needed here except as may be necessary to facilitate the understanding of the present invention.

In the preferred embodiment of the present invention, the wireless communication system 102 is a radiotelephone system, and in particular, a cellular radiotelephone system. Alternatively, the wireless communication system 102 may comprise a cordless radiotelephone system, a satellite communication system, a paging system, a trunked radio system, a personal communication system (PCS), and the like. The wireline communication network 104 need not be implemented in all of the alternative mentioned wireless communication systems, as is well known in the art. For example, all communications may be only wireless.

In the preferred embodiment of the present invention, the wireless communication devices 101, 103 and 105 are radio subscriber units 101, 103 and 105, and in particular, cellular radiotelephone subscriber units. Alternatively, the wireless communication devices 101, 103 and 105 may comprise cordless radiotelephones, pagers, one-way radios, two-way radios, personal data assistants, personal notebooks, remote controllers, and the like.

In the preferred embodiment of the present invention, the wireless communication devices 101, 103 and 105 are portable devices that operate in a wireless communication system 102 to advantageously provide users of the devices 101, 103 and 105 with portable communications. The portable device is easily carried by a user and transferable to a battery charger, a holster, a hang-up cup, a vehicular adapter, and the like, as is well known in the art.

In the preferred embodiment of the present invention, the wireless communication devices 101, 103 and 105 communicate with one of the plurality of remote stations 107, 109 and 111 via electromagnetic signals 121, 123 and 125 such as those in the radio frequency (RF) range, for example. In the preferred embodiment, the radio frequency signals 121, 123 and 125 are radiotelephone calls transmitted and received by the radiotelephones 101, 103 and 105, respectively,. The wireless communication devices 101, 103 and 105 may communicate voice only, data only, video or any combination thereof. The modulation of the electromagnetic signals communicated between the wireless communication devices 101, 103 and 105 and the fixed sites 107, 109 and 111 may be either analog or digital. Alternatively, the electromagnetic signals 121, 123 and 125 may be infra-red signals or any other signal capable of communicating information in a wireless environment.

In the preferred embodiment of the present invention, the remote stations 107, 109 and 111 are land-base stations. The wireless communication devices 101, 103 and 105 communicate with the remote stations 107, 109 and 111 which, in turn, couple two-way communication through the switch 113. Each of the remote stations 107, 109 and 111 have a transmitter and/or a receiver. Remote station 107, for example, has a transmitter 110 and a receiver 108. In the preferred embodiment of the present invention, the remote stations 107, 109 and 111 provide communications, throughout discrete radio coverage areas 115, 117, and 119, respectively, enabling the wireless communication devices 101, 103 and 105 to communicate with the wireless communication system 102 over predetermined geographic areas. In the preferred embodiment of the present invention, the predetermined geographic areas represent cellular macro-cells. Alternatively, the predetermined geographic areas 115. 117, 119 represent cellular mini-cells or micro-cells, as is well known in the art. Further, the remote stations 107, 109 and 111 may alternatively comprise satellites orbiting about the earth to communicate either directly with the wireless communication devices 101, 103 and 105 or through other land-base stations. Alternatively, the remote stations 107, 109 and 111 may comprise cordless base stations in a cordless radiotelephone system. Alternatively, the remote stations 107, 109 and 111 may comprise paging transmission and/or reception stations in a paging system.

In the preferred embodiment of the present invention, the switch 113 is a telephone exchange, and in particular, a cellular telephone exchange. Alternatively, the switch 113 may be a cordless telephone exchange such as used in PCS systems. In the preferred embodiment of the present invention, the switch 113 performs operations of call placement, control, interconnection with the wireline communication network 104, and the like.

Figure 2:
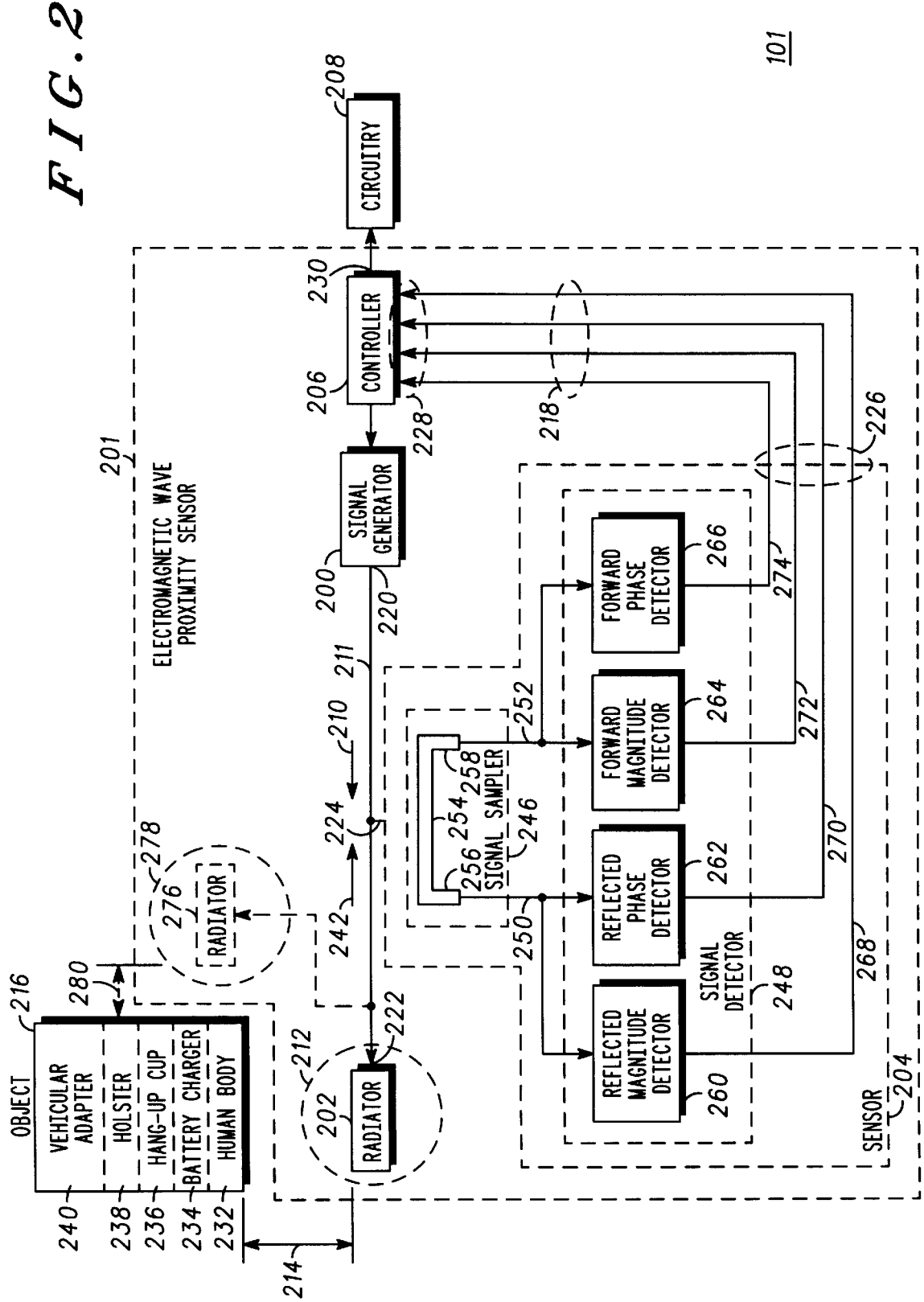
FIG. 2 illustrates a block diagram of a wireless communication device in accordance with an embodiment of the present invention.
Figure 3:
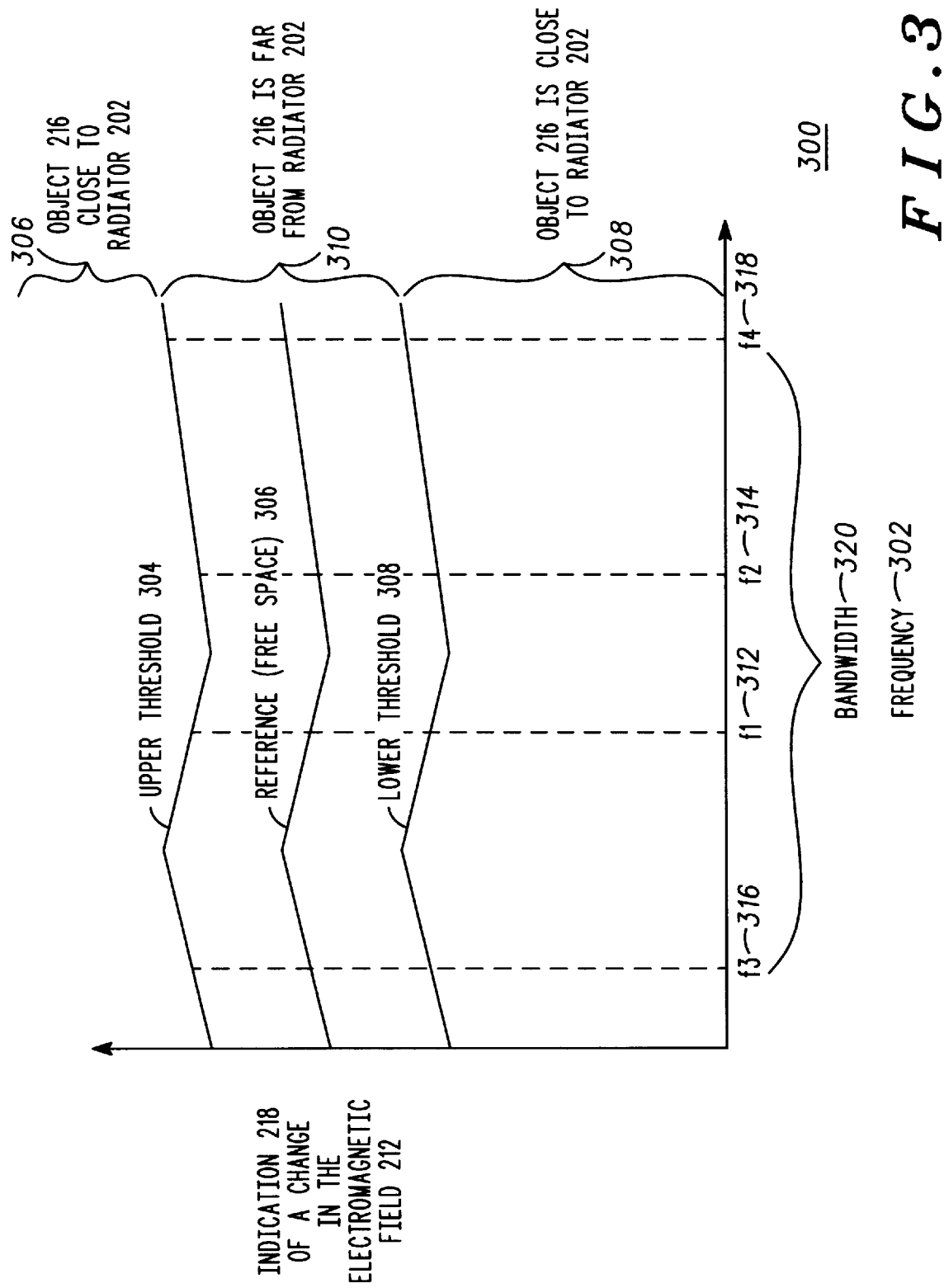
FIG. 3 illustrates a graph providing an indication of a change in an electromagnetic field versus frequency in accordance with the present invention.
Figure 4:
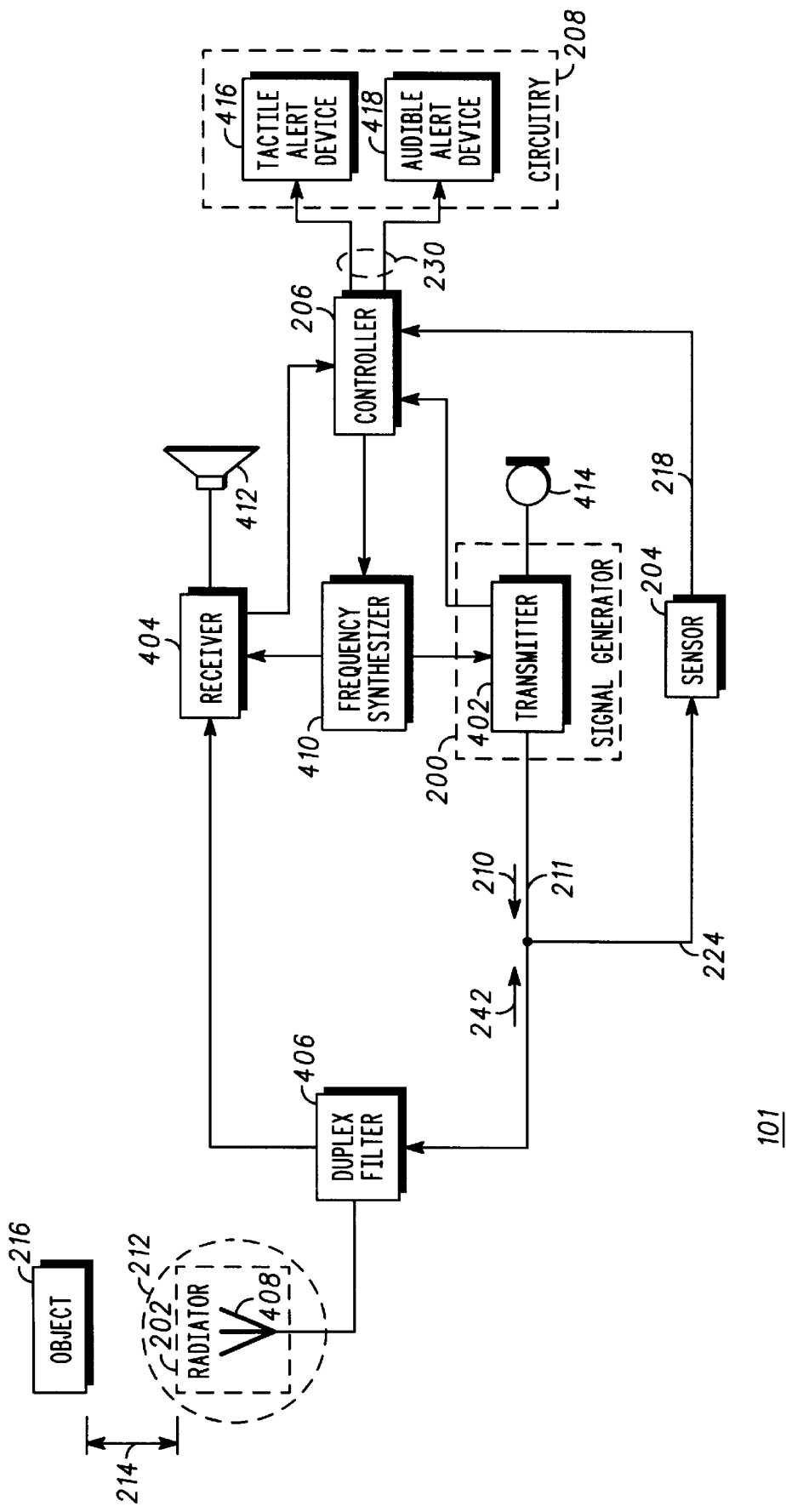
FIG. 4 illustrates a block diagram of a wireless communication device in accordance with a first embodiment of the present invention.
Figure 5:
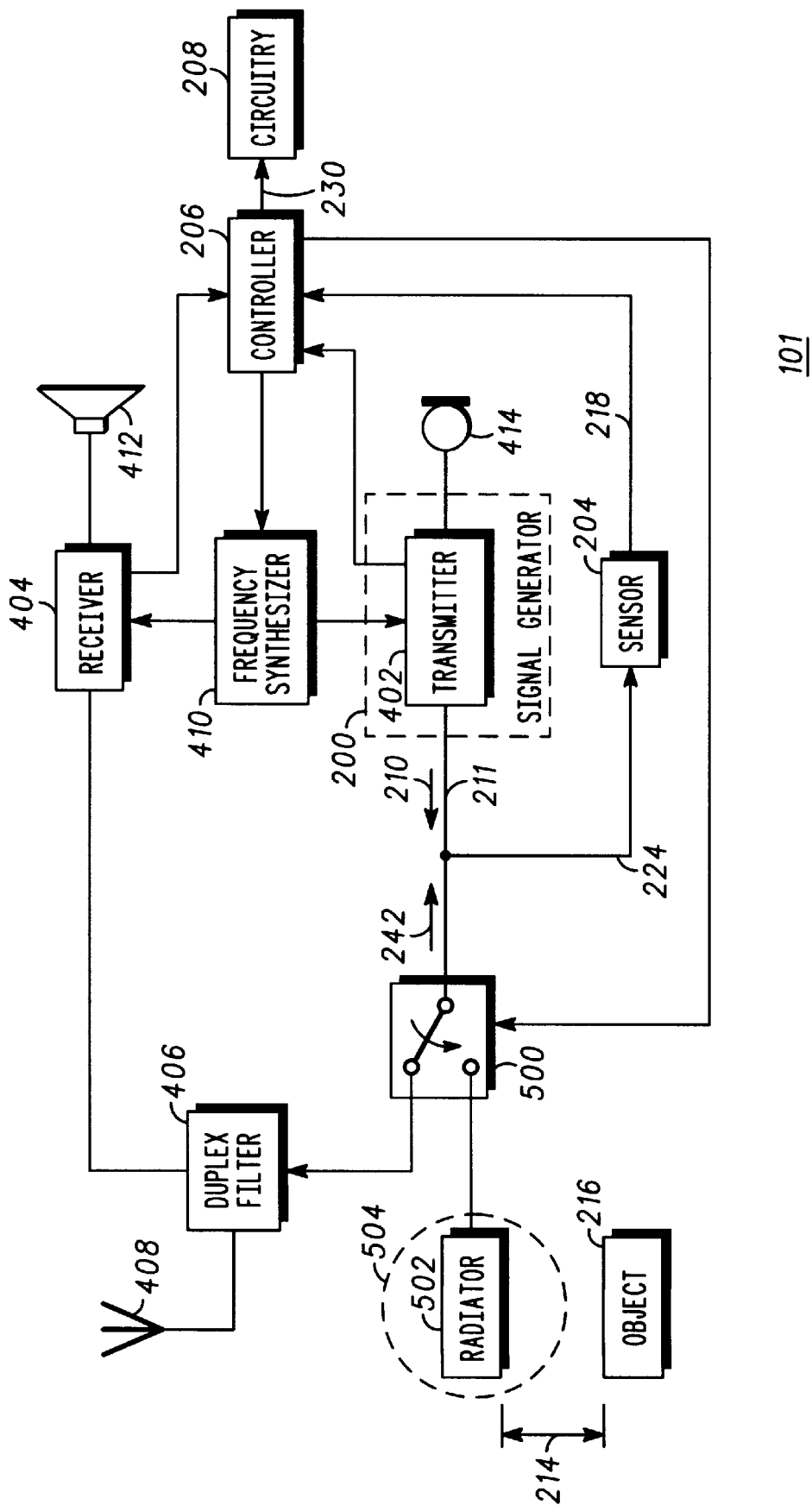
FIG. 5 illustrates a block diagram of a wireless communication device in accordance with a second embodiment of the present invention.
Figure 6:
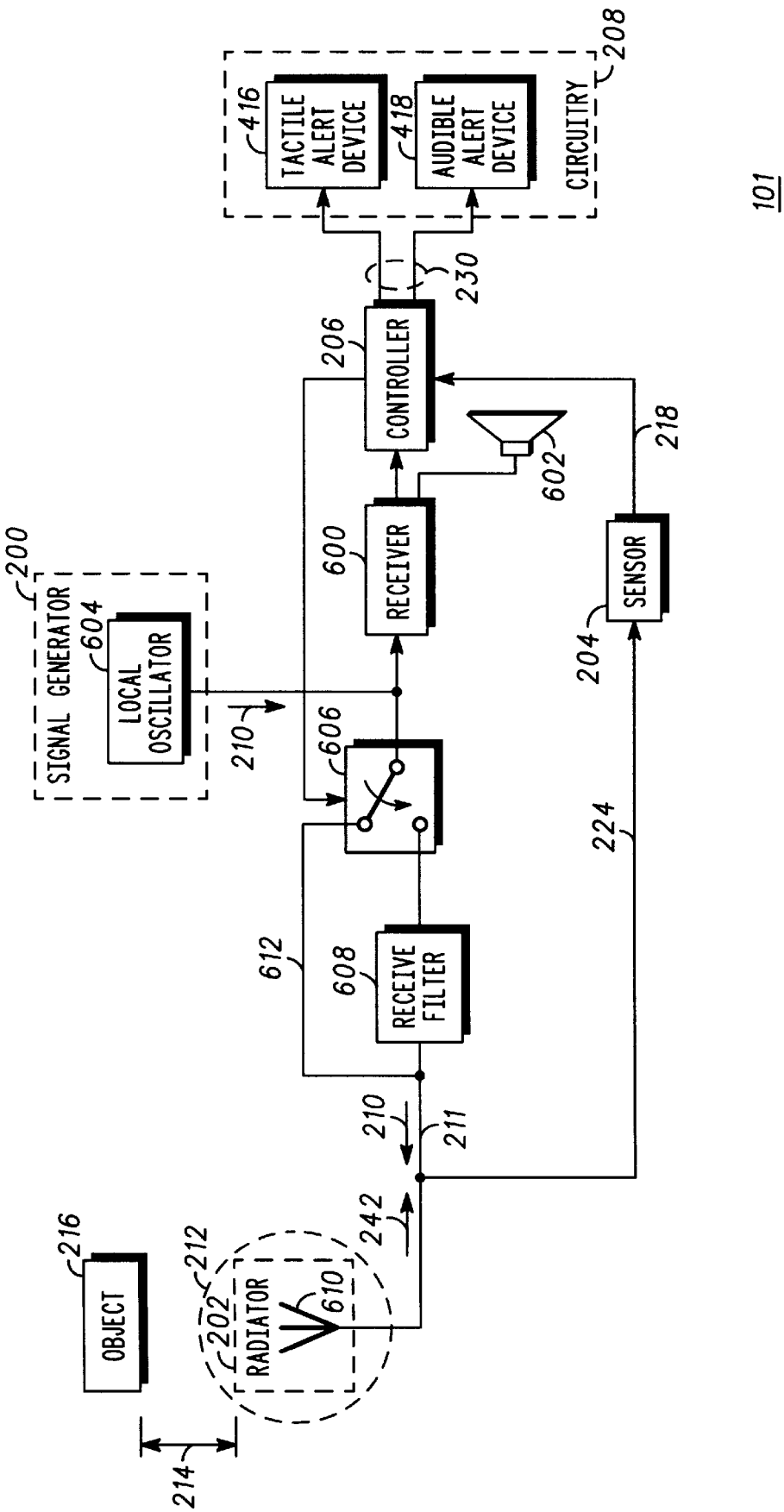
FIG. 6 illustrates a block diagram of a wireless communication device in accordance with a third embodiment of the present invention.
Figure 7:
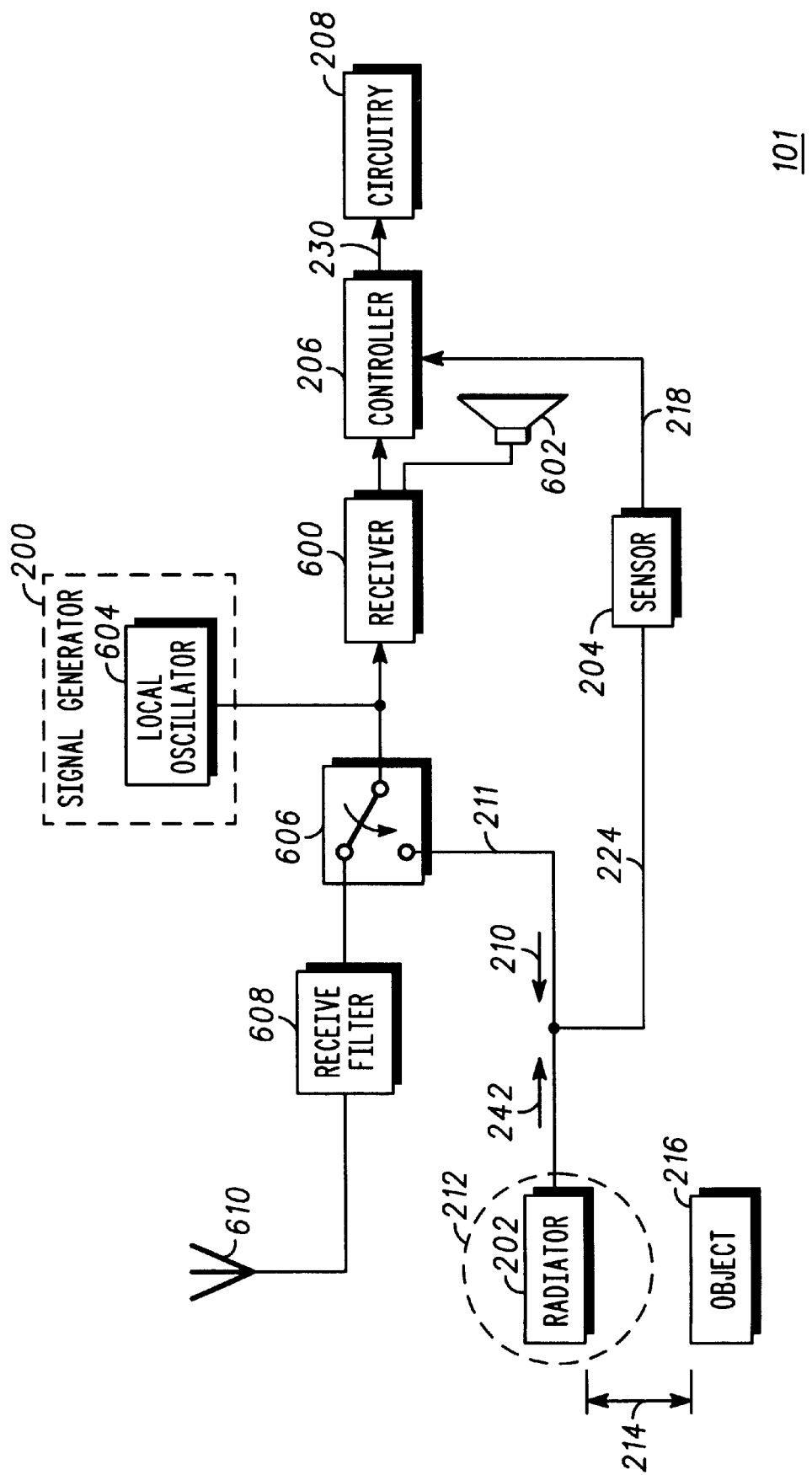
FIG. 7 illustrates a block diagram of a wireless communication device in accordance with a fourth embodiment of the present invention.

FIGS. 2 and 4–7 illustrate block diagrams of a wireless communication device 101, for example, according to various embodiments of the present invention. FIG. 3 illustrates a graph for supporting additional discussion relevant to the operation of FIG. 2. FIGS. 2 and 3 provide a broad overview of a preferred embodiment of the present invention. FIGS. 4 and 5 illustrate block diagrams of preferred embodiments of the wireless communication device 101 primarily having a transmitter, such as in a radiotelephone, for example. FIGS. 6 and 7 illustrate block diagrams of preferred embodiments of the wireless communication device 101 primarily having a receiver, such as in a pager, for example. All of the discussion for the wireless communication device 101 in FIGS. 2 and 3 also applies to the embodiments of FIGS. 4–7 with like reference numerals referring to the same elements in the various figures. Likewise, all of the discussion for radiotelephone embodiment of FIG. 4 also applies to FIG. 5 and all of the discussion for pager embodiment of FIG. 6 also applies to FIG. 7. Further, particular discussion related to the ciruitry 208 applies among FIGS. 2 and 4–7. In general, the discussion presented for the communication system of FIG. 1 applies to all the embodiments discussed in FIGS. 2–7.

FIG. 2 illustrates a block diagram of a wireless communication device 101, for example, in accordance with the present invention. The wireless communication device 101 is adapted for communicating with a remote station 107. The wireless communication device 101 comprises a signal generator 200, a radiator 202, a sensor 204, a controller 206 and circuitry 208. The signal generator 200 generates a forward signal 210 on line 211. The radiator 202, coupled to the signal generator 200, radiates the forward signal 210 to produce an electromagnetic field 212 near the radiator 202. The electromagnetic field 212 changes by a predetermined amount responsive to the proximity 214 of the radiator 202 to a predetermined object 216 external to the wireless communication device 101. The sensor 204, coupled to the radiator 202, provides an indication 218 of the predetermined amount of change in the electromagnetic field 212. The controller 206, coupled to the sensor 204, controls the circuitry 208 in the wireless communication device 101 responsive to the indication 218 of the predetermined amount of change in the electromagnetic field 212.

More particularly, the signal generator 200 has an output terminal 220 providing the forward signal 210. The radiator 202 has an input terminal 222. The input terminal 222 of the radiator 202 is coupled to the output terminal 220 of the signal generator 200. The radiator 202 radiates the forward signal 210 to produce the electromagnetic field 212 near the radiator 202. The electromagnetic field 212 changes by the predetermined amount responsive to the proximity 214 of the radiator 202 to the predetermined object external 216 to the wireless communication device 101. The sensor 204 has an input terminal 224 and an output terminal 226. The input terminal 224 of the sensor 204 is coupled to the input terminal 222 of the radiator 202. The output terminal 226 of the sensor 204 provides the indication 218 of the predetermined amount of change in the electromagnetic field 212. The controller 206 has an input terminal 228 and an output terminal 230. The input terminal 228 of the controller 206 is coupled to the output terminal 226 of the sensor 204. The output terminal 230 of the controller 206 controls the circuitry 208 in the wireless communication device 101 responsive to the indication 218 of the predetermined amount of change in the electromagnetic field 212.

According to the preferred embodiment of the present invention, the predetermined object 216 external to the wireless communication device 101 is a portion of a human body 232. Alternatively, the predetermined object 216 external to the wireless communication device 101 may be an element of a battery charger 234 adapted to charge a battery of the wireless communication device 101, an element of a hang-up cup 236 adapted to receive the wireless communication device 101, an element of a portable holster 238 adapted for carrying the wireless communication device 101, an element of a vehicular adapter 240 adapted for receiving the wireless communication device and the like. These objects represent, by example, many of the objects that the wireless communication device 101 normally encounters during operation. In the case of the human body 232, it is desirable to control the circuitry 208 depending on whether the wireless communication device 101 is on or off the human body. In the case of the alternative objects 232, 234, 236, 238 and 240, it is desirable to control the circuitry 208 in the device to cause an effect on the function of the wireless communication device 101 and/or the function of the object 232, 234, 236, 238 the wireless communication device 101 is near to or coupled to. Thus, the electromagnetic wave proximity sensor 201 can replace or be used in conjunction with conventional proximity detection devices such as reed switches, mechanical switches, Hall-effect switches, and the like.

The electromagnetic wave proximity detector 201 is operated at times in accordance with initial design decisions. For example, the electromagnetic wave proximity detector 201 may operate periodically to periodically check for the presence of the object. Alternatively, the electromagnetic wave proximity detector 201 may be operated at predetermined times based on other operations of the controller 206. For example, the electromagnetic wave proximity detector 201 may operate when the wireless communication device 101 is being paged, while the wireless communication device 101 is in a call, and/or when the wireless communication device 101 is not in a call.

The electromagnetic wave proximity detector 201 may have a sensitivity level adjustment associated therewith permitting a user to adjust its sensitivity accordingly. This feature would be particularly useful when the object 216 is the human body 232. Therefore, the user could adjust the proximity detector's sensitivity to account for the location of the wireless communication device 101 on the user's body, the type of clothes being worn by the user, and the like.

In the case of the other types of objects 234, 236, 238 and 240, for example, an element therein would provide an accurate target permitting the electromagnetic wave proximity detector 201 to accurately detect the location of the object near the electromagnetic field 212. Accurate detection is possible in these conditions because the design variables are predetermined. Therefore, in these types of application, the sensitivity level of the electromagnetic wave proximity detector 201 would typically be fixed.

It follows, therefore, that electromagnetic wave proximity detector 201 may be adjustable to accurately detect the human body and fixed to detect an element of the objects 234, 236, 238 and 240. The electromagnetic wave proximity detector 201 can activate two different sensing programs at different times to check for the different objects under different conditions.

According to the preferred embodiment of the present invention, the radiator 202 produces a reflected signal 242 on line 211 responsive to receiving the forward signal 210 on line 211. The reflected signal 242 is typically produced due to a mismatch between the signal generator 200 and the radiator 202, as is well known in the art. The sensor 204 provides the indication 218 of the predetermined amount of change in the electromagnetic field 212 responsive to at least one parameter of the forward signal 210 and at least one parameter of the reflected signal 242.

According to the preferred embodiment of the present invention, the sensor 204 further comprises a signal sampler 246 and a signal detector 248. The signal sampler 246, coupled to the radiator 202, samples the forward signal 210 and the reflected signal 242 to produce a forward sampled signal 252 and a reflected sampled signal 250, respectively. The signal detector 248, coupled to the signal sampler 246, detects the at least one parameter of the forward sampled signal 252 and the at least one parameter of the reflected sampled signal 250 to provide the indication 218 of the predetermined amount of change in the electromagnetic field 212.

According to the preferred embodiment of the present invention, the signal sampler 246 is a bidirectional coupler 254 having a first port 256 for sampling the reflected signal 242 on line 211 and having a second port 258 for sampling the forward signal 210 on line 211. Bi-directional couplers are generally well known in the art and will not be discussed in further detail.

According to the preferred embodiment of the present invention, the at least one parameter of the forward sampled signal 252 and at least one parameter of the reflected sampled signal 250 each include magnitude and phase. The signal detector 248 further comprises a reflected magnitude detector 260, a reflected phase detector 262, a forward magnitude detector 264, and a forward phase detector 266. The reflected magnitude detector 260 detects the magnitude of the reflected sampled signal 250. The reflected phase detector 262 detects the phase of the reflected sampled signal 250. The forward magnitude detector 264 detects the magnitude of the forward sampled signal 252. The forward phase detector 266 detects the phase of the forward sampled signal 252. A detected magnitude of the reflected sampled signal 268, a detected phase of the reflected sampled signal 270, a detected magnitude of the forward sampled signal 272, and a detected phase of the forward sampled signal 274 provide the indication 218 of the predetermined amount of change in the electromagnetic field 212. The reflected magnitude detector 260, the reflected phase detector 262, the forward magnitude detector 264, and the forward phase detector 266 are implemented using conventional diode circuits. Preferably, the reflected and forward magnitude detectors 260 and 264 use a single diode as an envelope detector. Preferably, the reflected and forward phase detectors 262 and 266 use a bridge type diode arrangement. Other implementations for magnitude and phase detectors may be implemented as well known to those skilled in the art.

The sensor 204 may alternatively comprise a circuit to detect changes in an electric field of one radiator and a magnetic field of another radiator. To support this alternative a radiator 276 producing electromagnetic field 278 is also shown in FIG. 2 in dotted lines. The dotted lines represent the radiator 278 as an alternative implementation for use with the wireless communication device 101. The second radiator 276, coupled to the signal generator 200, radiates the forward signal 210 at line 211 to produce the electromagnetic field 278. The electromagnetic field 278 changes by a predetermined amount responsive to the proximity 280 of the second radiator 276 to the predetermined object 216 external to the wireless communication device 101. The sensor 204, coupled to the first radiator 202 and the second radiator 276, provides an indication 218 of the predetermined amount of change in the electromagnetic field 212 of the first radiator 202 and the predetermined amount of change in the electromagnetic field 278 of the second radiator 276. The indication 218 of the predetermined amount of change in the electromagnetic field 212 of the first radiator 202 is responsive to a change in an electric field 212 of the first radiator 202. The indication 218 of the predetermined amount of change in the electromagnetic field 278 of the second radiator 276 is responsive to a change in a magnetic field of the second radiator 276. The first radiator 202 and the second radiator 276 may be antenna elements of a diversity receiver structure. Alternatively, the first radiator 202 and/or the second radiator 276 may be used solely for the purpose of implementing the electromagnetic proximity wave sensor 201.

In summary of the preferred embodiment of the present invention as shown in FIG. 2, a wireless communication device 101 is adapted for communicating with a remote base station 107. The wireless communication device 101 comprises the signal generator 200, the radiator 202, the bi-directional coupler 254, the signal detector 248 and the controller 206. The signal generator 200 generates the forward signal 210. The radiator 202, coupled to the signal generator 200, radiates the forward signal 210 to produce an electromagnetic field 212 near the radiator 202. The electromagnetic field 212 changes by a predetermined amount responsive to the proximity 214 of the radiator 202 to the predetermined object 216 external to the wireless communication device 101. The radiator 202 produces a reflected signal 242 responsive to receiving the forward signal 210. The bi-directional coupler 254, coupled to the radiator 202, has a first port 256 for sampling the reflected signal 242 and has a second port 258 for sampling the forward signal 210 to produce a reflected sampled signal 250 and a forward sampled signal 252, respectively. The signal detector 248, coupled to the bi-directional coupler 254, detects at least the magnitude and phase of the reflected sampled signal 250 and at least the magnitude and phase of the forward sampled signal 252 to provide the indication 218 of the predetermined amount of change in the electromagnetic field 212. The controller 206, coupled to the signal detector 148, controls circuitry 208 in the wireless communication device 101 responsive to the detected magnitude and phase of the reflected sampled signal 250 and the detected magnitude and phase of the forward sampled signal 252.

FIG. 3 illustrates a graph 300 plotting the indication 218 of a change in an electromagnetic field 212 versus frequency 302 in accordance with the present invention. The graph 300 represents how the controller 206 evaluates the information 218 provided by the sensor 204. The graph 300 includes an upper predetermined threshold 304, a free space reference 306 and a lower predetermined threshold 308.

According to the preferred embodiment of the present invention, the indication 218 of the predetermined amount of change in the electromagnetic field 212 is desirable when it is outside a predetermined range of values 310 and is undesirable when it is inside the predetermined range of values 310. The change is desirable when the object 216 is near to the radiator 202 (shown at 306 and 308), thereby causing the predetermined amount of change in the electromagnetic field 212. The change is undesirable when the object 216 is far from the radiator 202 (shown at 310), thereby not causing the predetermined amount of change in the electromagnetic field 212.

The indication 218 of the change in the electromagnetic field 212 changes with the frequency 302 of the forward signal 210 at line 211. The representation of the change in the electromagnetic field 212 over the frequency in FIG. 3 is only a sample of many variations that may be possible. Generally, the change is the electromagnetic field 212 over frequency 302 depends upon the nature of the radiator 202, the nature of the object 216, a transmit or receive frequency band, the orientation between the radiator 202 and the object 216, the distance between the radiator 202 and the object 216, and the like. These factors need to be considered when designing the electromagnetic wave proximity detector 201 into the wireless communication device 101.

The signal generator 200 may generate the forward signal 210 at two different frequencies 312 and 314 in order for the sensor 204 to more accurately detect the indication 218 of the change in the electromagnetic field 212. Since there would typically be only one signal generator 200, the signal generator 200 would generate the forward signal 210 at a first frequency 312 at a first point in time and at a second frequency 314 at a second point in time. The radiator 202 produces a reflected signal 242 at the first frequency 312 at the first point in time and at the second frequency 314 at the second point in time responsive to receiving the forward signal 210 generated at the first frequency 312 at the first point in time and at the second frequency 314 at the second point in time, respectively. The sensor 204 provides the indication 218 of the predetermined amount of change in the electromagnetic field 212 responsive to the first frequency 312 and the second frequency 314 of the forward signal 210 and the first frequency 312 and the second frequency 314 of the reflected signal 242. Taking the measurements at two frequencies may be performed by the controller 206 alone or in combination with the range detection represented by the three thresholds 304, 306 and 308. Sampling the reflected signal 242 at two frequencies 312 and 314 increases the likelihood of a valid detection given the variation in the change in the electromagnetic field 212 over frequency 302.

Using this alternative, the forward signal 210 is generated at the first frequency 312 at the first point in time on a control channel and the forward signal is generated at the second frequency 314 at the second point in time on a voice channel. Using the control channel and the voice channel represents one method of implementing the two frequency detection scheme. This method is preferred in a cellular radiotelephone application because the control channel is naturally on a different frequency than the voice channel during transmission of the forward signal 210. A further advantage of this method in a cellular radiotelephone application is that the switch between the control channel and the voice channel typically happens when the cellular radiotelephone is being paged by the cellular radiotelephone system. Therefore the electromagnetic wave proximity sensor 201 can operate before the cellular radiotelephone starts to ring to alert the user of an incoming call.

According to the preferred embodiment of the present invention, the predetermined amount of change in the electromagnetic field 212 is calibrated responsive to generating the forward signal 210 over a predetermined frequency band 320. Preferably, the calibration is performed during the initial design process. Alternatively, the calibration may be performed during the manufacture of the wireless communication device 101. This may be necessary due to the variation among components in a transmission lineup for each individual wireless communication device.

FIG. 4 illustrates a block diagram of a wireless communication device in accordance with a first embodiment of the present invention. The wireless communication device 101, configured as a radiotelephone in the preferred embodiment, generally comprises an antenna 408, a duplexer 406, a receiver 404, a transmitter 402, a speaker 412, a microphone 414, a frequency synthesizer 410, the controller 206, a tactile alert device 416, and an audible alert device 418. Generally, the antenna 408, the duplexer 406, the receiver 404, the transmitter 402, the speaker 412, the microphone 414, the frequency synthesizer 410, the tactile alert device 416, and the audible alert device 418 are each individually well known in the art, and hence no additional description need be given except as may be necessary to facilitate the understanding of the present invention. Further, the general operation of a radiotelephone is well known in the art and will not be described except as may be necessary to facilitate the understanding of the present invention.

In the preferred embodiment of the present invention, the audible alert device 418 is a ringer. The audible alert device 418 is operable to generate an audible alert when enabled by the controller 206. In the preferred embodiment of the present invention, the tactile alert device 416 is a vibrator. The tactile alert device 416 is operable to generate a tactile alert when enabled by the controller 206.

According to the first preferred embodiment of the present invention, the signal generator 200 is a radio frequency (RF) transmitter 402 for generating the forward signal 210 as a transmitted signal at a radio frequency. In a cellular radiotelephone, the preferred transmit operating frequency band is 824 MHz to 845 MHz. The forward signal 210 is a communication signal including at least one of a voice signal and a data signal. In this case the forward signal 210 is generated as part of the radiotelephone's normal transmission during the set up or while in a phone call. Alternatively, the forward signal 210 may be generated solely for the purpose of taking a proximity measurement, thereby not being related a phone call.

In a cellular radiotelephone, the radiator 202 is a monopole antenna 408 tuned to the operating frequency of 824 MHz to 845 MHz. In the preferred embodiment, the antenna 408 is a tightly wound helical, normal mode antenna. However, any antenna construction may be used which would transmit in the desirable frequency band. The antenna 408 forms the radiator 202. The antenna 408, coupled to the transmitter 402, radiates the forward signal 210 at the radio frequency to a remote radio frequency (RF) receiver 108 adapted to receive the forward signal 210.

Therefore, the antenna 408, coupled to the transmitter 402, radiates the forward signal 210 to produce an electromagnetic field 212 near the antenna 408. The electromagnetic field 212 changes by a predetermined amount responsive to the proximity 214 of the antenna 408 to the predetermined object 216 external to the radiotelephone. The sensor 204, coupled to the antenna 408, provides an indication 218 of the predetermined amount of change in the electromagnetic field 212. The controller 206, coupled to the sensor 204, controls the circuitry 208 in the radiotelephone 101 responsive to the indication 218 of the predetermined amount of change in the electromagnetic field 212.

Preferably, the electromagnetic field 212 is a near field structure as opposed to a plain wave structure. The difference between these two structures is well known in the art. At the preferred operating frequencies of a cellular radiotelephone, the near field extends a few inches from the antenna 408. Therefore, at the preferred transmit frequency range of a cellular radiotelephone, the object 216 needs to come within a few inches of the antenna 408 in order for the sensor 204 to properly detect the object 216 within the electromagnetic field 212.

A primary advantage of implementing an electromagnetic wave proximity detector 201 in a radiotelephone is the high degree of integration among parts and functions of the radiotelephone. In the first embodiment as shown in FIG. 4, all of the parts of the proximity detector 201, including the transmitter 402, the antenna 408, the bidirectional coupler 254, the forward magnitude detector 264 of the signal detector 248 and the controller are already implemented in the radiotelephone to perform traditional radiotelephone transmit functions, such as making a phone call. For example, the bi-directional coupler 254 and the forward magnitude detector 264 are used by radiotelephones for transmit power control, as is well known in the art. However, by tapping off the first port 250 of the bi-directional coupler 254 and adding the reflected signal detectors 260 and 262 and the forward phase detector 266, the parameters of the reflected signal 242 can be compared against the parameters of the forward signal 210 to determine if there is a predetermined change in the electromagnetic field 212 due to the presence of the predetermined object. Thus, for the price of a few diodes to implement the reflected signal detectors 260 and 262 and the forward phase detector 266, a traditional radiotelephone has incorporated therein the parts needed to implement the electromagnetic wave proximity detector 201.

Not only are the parts of the radiotelephone and the electromagnetic wave proximity detector 201 highly integrated, but the functions of the radiotelephone and the electromagnetic wave proximity detector 201 are also highly integrated. The electromagnetic wave proximity detector 201 preferably operates while the radiotelephone is transmitting a communication signal in a traditional fashion. Therefore, while the radiotelephone is setting up a call or in a call, the electromagnetic wave proximity detector 201 is operating. Alternatively, the electromagnetic wave proximity detector 201 may operate when the radiotelephone is not transmitting a communication signal. Using this method the transmitter would typically transmit the forward signal 210 at low power level so as not to interfere with the operation of the wireless communication system 202.

In summary of the first preferred embodiment of the present invention as shown in FIG. 4, the radiotelephone 101 is adapted for communicating with a remote base station 107. The radiotelephone 101 comprises the transmitter 402, the antenna 408, the bi-directional coupler 254, the signal detector 248 and the controller 206. The transmitter 402 generates the forward signal 210 at the radio frequency. The forward signal 210 is the communication signal including at least one of the voice signal and the data signal. The antenna 408, coupled to the transmitter 402, radiates the forward signal 210 at the radio frequency to produce an electromagnetic field 212 near the antenna 408 and to communicate with the remote RF receiver 108 adapted to receive the forward signal 210. The electromagnetic field 212 changes by a predetermined amount responsive to the proximity 214 of the antenna 408 to a predetermined object 216 external to the radiotelephone 101. The antenna 408 produces a reflected signal 242 responsive to receiving the forward signal 210. The bi-directional coupler 254, coupled to the antenna 408, has a first port 256 for sampling the reflected signal 242 and has a second port 258 for sampling the forward signal 210 to produce a reflected sampled signal 250 and a forward sampled signal 252, respectively. The signal detector 248, coupled to the bi-directional coupler 254, detects at least the magnitude and phase of the forward sampled signal 252 and at least the magnitude and phase of the reflected sampled signal 250 to provide the indication 218 of the predetermined amount of change in the electromagnetic field 212. The controller 206, coupled to the signal detector 248, controls circuitry 208 in the radiotelephone 101 responsive to the detected magnitude 268 and phase 270 of the reflected sampled signal 250 and the detected magnitude 272 and phase 274 of the forward sampled signal 252.

FIG. 5 illustrates a block diagram of the radiotelephone 101 in accordance with a second embodiment of the present invention. According to a second embodiment of the present invention, the radiotelephone 101 further comprises another radiator 502 and a switch 500. The antenna 408 performs the traditional function of radiating the forward signal 210 at the radio frequency to communicate with the remote RF receiver 108 adapted to receive the forward signal 210. The radiator 502 performs the additional function of proximity detection. The switch 500, coupled to the transmitter 402, the antenna 408 and the radiator 502, selectively couples the transmitter 402 to the antenna 408 or the radiator 502. The controller 206 controls the switch 500 to alternatively transmit a communication signal and sense the proximity of the object 216. Alternatively, the switch may be eliminated wherein the transmitter 402, the duplex filter 406 and the radiator 502 are directly connected so that the proximity detector operates when a communication signal is transmitted.

Having the antenna 408 and the radiator 502 provide advantages not realized by having only the antenna 408 as implemented in FIG. 4. In some applications the traditional antenna design and location may not provide the best operation as a proximity detector. However, the radiator 502 may be designed and located for optimal operation as a proximity detector. The radiator 502 would typically be located within a housing of the radiotelephone.

FIG. 6 illustrates a block diagram of a wireless communication device 100 in accordance with a third embodiment of the present invention. According to the third embodiment, the wireless communication device 100 is a pager. The pager 101 comprises a receiver 600, a receive filter 608, a local oscillator, a switch 606 and an antenna 610. According to the third embodiment, the signal generator 200 is a local oscillator 604 for generating the forward signal 210 at a predetermined frequency. According to the third embodiment, the radiator 202 is the antenna 610. The RF receiver 600, coupled to the local oscillator 604 and the antenna 610, receives signals from the antenna 610 responsive to the predetermined frequency of the forward signal 210. The switch 606, coupled to the local oscillator 604 and the antenna 610, selectively couples the local oscillator 604 to the antenna 610. The switch 606 permits the forward signal 210 to by pass the receive filter 608 to reach the antenna 610. The switch 606 is controlled by the controller 606 at line 614.

Therefore, for the cost of the switch 606 and the sensor 204, a traditional pager can having incorporated therein the electromagnetic wave proximity sensor 201. With the switch 606 in place, the pager can only operate the proximity detector 201 when the pager is not receiving a page.

FIG. 7 illustrates a block diagram of a wireless communication device in accordance with a fourth embodiment of the present invention. According to the fourth embodiment of the present invention, the pager 101 further comprises the radiator 202 and the switch 606. The antenna 610 performs the traditional function of receiving signals at the radio frequency to communicate with the remote RF transmitter 110. The RF receiver 600, coupled to the local oscillator 604, and the antenna 610, receives signals from the antenna 610 responsive to the predetermined frequency of the forward signal 210. The radiator 202 performs the additional function of proximity detection. The switch 606, coupled to the local oscillator 604, the antenna 610 and the radiator 202, selectively couples the local oscillator 604 to the antenna 610 or the radiator 202. The controller 206 controls the switch 606 to alternatively receive a communication signal and sense the proximity of the object 216. Alternatively, the switch 606 may be eliminated wherein the receiver 600, the local oscillator 604, the receive filter 608 and the radiator 202 are directly connected so that the proximity detector operates when the local oscillator is generating the forward signal 210.

Having the antenna 610 and the radiator 202 provide advantages not realized by having only the antenna 610 as implemented in FIG. 5. In some applications the traditional antenna design and location may not provide the best operation as a proximity detector. However, the radiator 202 may be designed and located for optimal operation as a proximity detector. The radiator 202 would typically be located within a housing of the pager.

What is claimed is:

1. A wireless communication device adapted for communicating with a remote station comprising:
   a signal generator for generating a forward signal;
   a first radiator, coupled to the signal generator, for radiating the forward signal to produce an electromagnetic field near the first radiator, wherein the electromagnetic field changes by a predetermined amount responsive to the proximity of the first radiator to a predetermined object external to the wireless communication device, wherein the first radiator produces a reflected signal responsive to receiving the forward signal;
   a sensor, coupled to the first radiator, for providing an indication of the predetermined amount of change in the electromagnetic field responsive to at least one parameter of the forward signal and at least one parameter of the reflected signal, wherein the sensor further comprises:
      a signal sampler, coupled to the first radiator, for sampling the forward signal and the reflected signal to produce a forward sampled signal and a reflected sampled signal, respectively; and
      a signal detector, coupled to the signal sampler, for detecting at least one parameter of the forward sampled signal and at least one parameter of the reflected sampled signal to provide the indication of the predetermined amount of change in the electromagnetic field; and
   a controller, coupled to the sensor, for controlling circuitry in the wireless comnnunication device responsive to the indication of the predetermined amount of change in the electromagnetic field.

2. A wireless communication device according to claim 1 wherein the controller controls the circuitry to operate in a first mode responsive to a first indication of a first predetermined amount of change in the electromagnetic field and controls the circuitry to operate in a second mode responsive to a second indication of a second predetermined amount of change in the electromagnetic field.

3. A wireless communication device according to claim 2 wherein the circuitry further comprises:
   a tactile alert device; and
   an audible alert device,
   wherein the circuitry operates in the first mode by permitting a first one of the tactile alert device and the audible alert device to be activated and by not permitting a second one of the tactile alert device and the audible alert device to be activated, and
   wherein the circuitry operates in the second mode by not permitting the first one of the tactile alert device and the audible alert device to be activated and by permitting the second one of the tactile alert device and the audible alert device to be activated.

4. A wireless communication device according to claim 1 wherein the signal sampler further comprises:
   a bi-directional coupler having a first port for sampling the forward signal and having a second port for sampling the reflected signal.

5. A wireless communication device according to claim 1 wherein the at least one parameter of the forward sampled signal and the at least one parameter of the reflected sampled signal each include magnitude and phase, the signal detector further comprises:
   a forward magnitude detector for detecting the magnitude of the forward sampled signal;
   a forward phase detector for detecting the phase of the forward sampled signal;
   a reflected magnitude detector for detecting the magnitude of the reflected sampled signal; and
   a reflected phase detector for detecting the phase of the reflected sampled signal;
   wherein the magnitude of the forward sampled signal, the phase of the forward sampled signal, the magnitude of the reflected sampled signal, and the phase of the reflected sampled signal provide the indication of the predetermined amount of change in the electromagnetic field.

6. A wireless communication device according to claim 1 wherein:
   the signal generator is a radio frequency (RF) transmitter for generating the forward signal at a radio frequency;
   the forward signal is a communication signal including at least one of a voice signal and a data signal; and the first radiator forms an antenna, coupled to the RF transmitter, for radiating the forward signal at the radio frequency to a remote radio frequency (RF) receiver adapted to receive the forward signal.

7. A wireless communication device according to claim 1 wherein:

the signal generator is a radio frequency (RF) transmitter for generating the forward signal;

the forward signal is a communication signal including at least one of a voice signal and a data signal; and the wireless communication device further comprises:

a second radiator forming an antenna, coupled to the RF transmitter, for radiating the forward signal at the radio frequency to communicate with a remote radio frequency (RF) receiver adapted to receive the forward signal.

8. A wireless communication device according to claim 7 further comprising:

a switch, coupled to the RF transmitter, the first radiator and the second radiator, for selectively coupling the RF transmitter to at least one of the first radiator and the second radiator.

9. A wireless communication device according to claim 1:

wherein the signal generator is a local oscillator for generating the forward signal at a predetermined frequency;

wherein the first radiator forms an antenna; and wherein the wireless communication device further comprises:

a radio frequency (RF) receiver, coupled to the local oscillator and the antenna, for receiving signals from the first radiator responsive to the predetermined frequency of the forward signal.

10. A wireless communication device according to claim 9 further comprising:

a switch, coupled to the local oscillator and the first radiator, for selectively coupling the local oscillator to the first radiator.

11. A wireless communication device according to claim 1:

wherein the signal generator is a local oscillator generating the forward signal at a predetermined frequency; and wherein the wireless communication device further comprises:

a second radiator forming an antenna; and a radio frequency (RF) receiver, coupled to the local oscillator, and the second radiator, for receiving signals from the second radiator responsive to the predetermined frequency of the forward signal.

12. A wireless communication device according to claim 11 further comprising:

a switch, coupled to the local oscillator, the first radiator and the second radiator, for selectively coupling the local oscillator to at least one of the first radiator and the second radiator.

13. A wireless communication device according to claim 1:

wherein the signal generator generates the forward signal at a first frequency at a first point in time and at a second frequency at a second point in time;

wherein the first radiator produces a reflected signal at the first frequency at the first point in time and at the second frequency at the second point in time responsive to receiving the forward signal generated at the first frequency at the first point in time and at the second frequency at the second point in time, respectively; and wherein the sensor provides the indication of the predetermined amount of change in the electromagnetic field responsive to the first frequency and the second frequency of the forward signal and the first frequency and the second frequency of the reflected signal.

14. A wireless communication device according to claim 13 wherein:

the forward signal is generated at the first frequency at the first point in time on a control channel; and the forward signal is generated at the second frequency at the second point in time on a voice channel.

15. A wireless communication device according to claim 1 further comprising:

a second radiator, coupled to the signal generator, for radiating the forward signal to produce an electromagnetirc field, wherein the electromagnetic field changes by a predetermined amount responsive to the proximity of the second radiator to a predetermined object external to the wireless communication device;

wherein the sensor, coupled to the first radiator and the second radiator, provides an indication of the predetermined amount of change in the electromagnetic field of the first radiator and an indication of the predetermined amount of change in the electromagnetic field of the second radiator;

wherein the indicaton of the predetermined amount of change in the eletromagnetic field of the first radiator is responsive to a change in an electric field of the first radiator; and wherein the indication of the predetermined amount of change in the electromagnetic field of the second radiator is responsive to a change in a magnetic field of the second radiator.

16. A wireless communication device according to claim 1 wherein the predetermined object external to the wireless communication device is a portion of a human body.

17. A wireless communication device according to claim 1 wherein the predetermined object external to the wireless communication device is an element of a battery charger adapted to charge a battery of the wireless communication device.

18. A wireless communication device according to claim 1 wherein the predetermined object external to the wireless communication device is an element of a hang-up cup adapted to receive the wireless communication device.

19. A wireless communication device according to claim 1 wherein the predetermined object external to the wireless communication device is an element of a portable holster adapted for carrying the wireless communication device.

20. A wireless communication device according to claim 1 wherein the indication of the predetermined amount of change in the electromagnetic field is desirable when it is inside a predetermined range of values and is undesirable when it is outside the predetermined range of values.

21. A wireless communication device adapted for communicating with a remote station comprising:

a radio frequency (RF) transmitter for generating a forward signal at a radio frequency, wherein the forward signal is a communication signal including at least one of a voice signal and a data signal;

an antenna, coupled to the RF transmitter, for radiating the forward signal at the radio frequency to produce an electromagnetic field near the antenna and to communicate with a remote radio frequency (RF) receiver adapted to receive the forward signal, wherein the electromagnetic field changes by a predetermined amount responsive to the proximity of the antenna to a predetermined object external to the wireless communication device, and wherein the antenna produces a reflected signal responsive to receiving the forward signal;

a signal sampler, coupled to the antenna, for sampling the forward signal and the reflected signal to produce a forward sampled signal and a reflected sampled signal, respectively;

a signal detector, coupled to the signal sampler, for detecting at least one parameter of the forward sampled signal and at least one parameter of the reflected sampled signal to provide the indication of the predetermined amount of change in the electromagnetic field; and a controller, coupled to the signal detector, for controlling circuitry in the wireless communication device responsive to the at least one parameter of the forward sampled signal and the at least one parameter of the reflected sampled signal.

22. A wireless communication device according to claim 21 wherein the signal sampler further comprises:
   a bi-directional coupler having a first port for sampling the forward signal and having a second port for sampling the reflected signal.

23. A wireless communication device according to claim 21 wherein the at least one parameter of the forward sampled signal includes magnitude and phase and the at least one parameter of the reflected sampled signal includes magnitude and phase, the signal detector further comprises:
   a forward magnitude detector for detecting the magnitude of the forward sampled signal;
   a forward phase detector for detecting the phase of the forward sampled signal;
   a reflected magnitude detector for detecting the magnitude of the reflected sampled signal; and
   a reflected phase detector for detecting the phase of the reflected sampled signal;
   wherein the controller, coupled to the signal detector, controls circuitry in the wireless communication device responsive to the magnitude and phase of the forward sampled signal and the magnitude and phase of the reflected sampled signal.

24. A wireless communication device adapted for communicating with a remote station comprising:
   a radio frequency (RF) transmitter for generating a forward signal at a radio frequency, wherein the forward signal is a communication signal including at least one of a voice signal and a data signal;
   a first radiator, forming a proximity sensor and coupled to the RF transmitter, for radiating the forward signal at the radio frequency to produce an electromagnetic field near the first radiator, wherein the electromagnetic field changes by a predetermined amount responsive to the proximity of the first radiator to a predetermined object external to the wireless communication device, and wherein the first radiator produces a reflected signal responsive to receiving the forward signal;
   a second radiator, forming an antenna and coupled to the RF transmitter, for radiating the forward signal at the radio frequency to communicate with a remote radio frequency (RF) receiver adapted to receive the forward signal;
   a switch, coupled to the RF transmitter, the first radiator and the second radiator, for selectively coupling the RF transmitter to at least one of the first radiator and the second radiator;
   a signal sampler, coupled to the first radiator, for sampling the forward signal and the reflected signal to produce a forward sampled signal and a reflected sampled signal, respectively;
   a signal detector, coupled to the signal sampler, for detecting at least one parameter of the forward sampled signal and at least one parameter of the reflected sampled signal to provide the indication of the predetermined amount of change in the electromagnetic field; and
   a controller, coupled to the signal detector, for controlling circuitry in the wireless communication device responsive to the at least one parameter of the forward sampled signal and the at least one parameter of the reflected sampled signal.

25. A wireless communication device according to claim 24 wherein the signal sampler further comprises:
   a bi-directional coupler having a first port for sampling the forward signal and having a second port for sampling the reflected signal.

26. A wireless communication device according to claim 24 wherein the at least one parameter of the forward sampled signal includes magnitude and phase and the at least one parameter of the reflected sampled signal includes magnitude and phase, the signal detector further comprises:
   a forward magnitude detector for detecting the magnitude of the forward sampled signal;
   a forward phase detector for detecting the phase of the forward sampled signal;
   a reflected magnitude detector for detecting the magnitude of the reflected sampled signal; and
   a reflected phase detector for detecting the phase of the reflected sampled signal;
   wherein the controller, coupled to the signal detector, controls circuitry in the wireless communication device responsive to the magnitude and the phase of the forward sampled signal and the magnitude and the phase of the reflected sampled signal.

27. A wireless communication device adapted for communicating with a remote station comprising:
   a local oscillator for generating a forward signal at a predetermined frequency;
   an antenna, coupled to the local oscillator, for radiating the forward signal to produce an electromagnetic field near the antenna, wherein the electromagnetic field changes by a predetermined amount responsive to the proximity of the antenna to a predetermined object external to the wireless communication device, and wherein the antenna produces a reflected signal responsive to receiving the forward signal;
   a radio frequency (RF) receiver, coupled to the local oscillator and the antenna, for receiving signals transmitted from a remote RF transmitter from the antenna responsive to the predetermined frequency of the forward signal;
   a switch, coupled to the local oscillator and the antenna, for selectively coupling the local oscillator to the antenna;
   a signal sampler, coupled to the antenna, for sampling the forward signal and the reflected signal to produce a forward sampled signal and a reflected sampled signal, respectively;

a signal detector, coupled to the signal sampler, for detecting at least one parameter of the forward sampled signal and at least one parameter of the reflected sampled signal to provide the indication of the predetermined amount of change in the electromagnetic field;

a controller, coupled to the signal detector, for controlling circuitry in the wireless communication device responsive to the at least one parameter of the forward sampled signal and the at least one parameter of the reflected sampled signal.

28. A wireless communication device according to claim 27 wherein the signal sampler further comprises:

a bi-directional coupler having a first port for sampling the forward signal and having a second port for sampling the reflected signal.

29. A wireless communication device according to claim 27 wherein the at least one parameter of the forward sampled signal includes magnitude and phase and the at least one parameter of the reflected sampled signal includes magnitude and phase, the signal detector further comprises:

a forward magnitude detector for detecting the magnitude of the forward sampled signal;

a forward phase detector for detecting the phase of the forward sampled signal;

a reflected magnitude detector for detecting the magnitude of the reflected sampled signal; and a reflected phase detector for detecting the phase of the reflected sampled signal;

wherein the controller, coupled to the signal detector, controls circuitry in the wireless communication device responsive to the magnitude and the phase of the forward sampled signal and the magnitude and the phase of the reflected sampled signal.

30. A wireless communication device adapted for communicating with a remote station comprising:

a local oscillator for generating a forward signal at a predetermined frequency;

a first radiator, forming a proximity sensor and coupled to the local oscillator, for radiating the forward signal to produce an electromagnetic field near the first radiator, wherein the electromagnetic field changes by a predetermined amount responsive to the proximity of the first radiator to a predetermined object external to the wireless communication device, and wherein the first radiator produces a reflected signal responsive to receiving the forward signal;

a second radiator, forming an antenna, for receiving communication signals at radio frequencies transmitted from a remote RF transmitter from the antenna;

a radio frequency (RF) receiver, coupled to the local oscillator and the second radiator, for receiving the communication signals responsive to the predetermined frequency of the forward signal;

a switch, coupled to the local oscillator, the first radiator and the second radiator, for selectively coupling the local oscillator to at least one of the first radiator and the second radiator;

a signal sampler, coupled to the first radiator, for sampling the forward signal and the reflected signal to produce a forward sampled signal and a reflected sampled signal, respectively;

a signal detector, coupled to the signal sampler, for detecting at least one parameter of the forward sampled signal and at least one parameter of the reflected sampled signal to provide the indication of the predetermined amount of change in the electromagnetic field;

a controller, coupled to the signal detector, for controlling circuitry in the wireless communication device responsive to the at least one parameter of the forward sampled signal and the at least one parameter of the reflected sampled signal.

31. A wireless communication device according to claim 30 wherein the signal sampler further comprises:

a bi-directional coupler having a first port for sampling the forward signal and having a second port for sampling the reflected signal.

32. A wireless communication device according to claim 30 wherein the at least one parameter of the forward sampled signal includes magnitude and phase and the at least one parameter of the reflected sampled signal includes magnitude and phase, the signal detector further comprises:

a forward magnitude detector for detecting the magnitude of the forward sampled signal;

a forward phase detector for detecting the phase of the forward sampled signal;

a reflected magnitude detector for detecting the magnitude of the reflected sampled signal; and a reflected phase detector for detecting the phase of the reflected sampled signal;

wherein the controller, coupled to the signal detector, controls circuitry in the wireless communication device responsive to the magnitude and the phase of the forward sampled signal and the magnitude and the phase of the reflected sampled signal.

33. A method for operating a wireless communication device adapted for communicating with a remote station comprising the steps of:

generating a forward signal;

radiating, by a radiator, the forward signal to produce an electromagnetic field near the radiator, wherein the radiator produces a reflected signal responsive to receiving the forward signal, wherein the electromagnetic field changes by a predetermined amount responsive to the proximity of the radiator to a predetermined object external to the wireless communication device;

providing an indication of the predetermined amount of change in the electromagnetic field, wherein the step of providing further comprises the steps of:

sampling the forward signal and the reflected signal to produce a forward sampled signal and a reflected sampled signal; and detecting at least one parameter of the forward sampled signal and at least one parameter of the reflected sampled signal to provide the indication of the predetermined amount of change in the electromagnetic field; and controlling circuitry in the wireless communication device responsive to the indication of the predetermined amount of change in the electromagnetic field.

34. A method for operating a wireless communication device according to claim 33 wherein the step of controlling further comprises the steps of:

controlling the circuitry to operate in a first mode responsive to a first indication of the predetermined amount of change in the electromagnetic field, and controlling the circuitry to operate in a second mode responsive to a second indication of the predetermined amount of change in the electromagnetic field.

35. A method for operating a wireless communication device according to claim 34 wherein the step of controlling further comprises the steps of:

causing a tactile alert device to be activated and not causing an audible alert device to be activated when the circuitry operates in the first mode, and not causing the tactile alert device to be activated and causing the audible alert device to be activated when the circuitry operates in the second mode.

36. A method for operating a wireless communication device according to claim 35 wherein the at least one parameter of the forward sampled signal includes magnitude and phase and the at least one parameter of the reflected sampled signal includes magnitude and phase, the step of detecting further comprises the steps of:

detecting the magnitude of the forward sampled signal;

detecting the phase of the forward sampled signal;

detecting the magnitude of the reflected sampled signal; and detecting the phase of the reflected sampled signal;

wherein the step of controlling controls circuitry in the wireless communication device responsive to the magnitude and the phase of the forward sampled signal and the magnitude and the phase of the reflected sampled signal.

37. A method for operating a wireless communication device according to claim 33 further comprising the step of:

calibrating the predetermined amount of change in the electromagnetic field responsive to generating the forward signal over a predetermined frequency band.

38. A wireless communication device adapted for communicating with a remote station comprising:

a signal generator having an output terminal providing a signal;

a radiator having an input terminal, the input terminal of the radiator being coupled to the output terminal of the signal generator, the radiator radiating the signal to produce an electromagnetic field near the radiator, the electromagnetic field changes by a predetermined amount responsive to the proximity of the radiator to a predetermined object external to the wireless communication device including at least one of a portion of a human body, an element of a battery charger adapted to charge a battery of the wireless communication device, an element of a hang-up cup adapted to receive the wireless communication device, and an element of a portable holster adapted for carrying the wireless communication device;

a sensor having an input terminal and an output terminal, the input terminal of the sensor being coupled to the input terminal of the radiator, the output terminal of the sensor providing first and second indications of the predetermined amount of change in the electromagnetic field corresponding to predetermined object being near to and far from the electromagnetic field, respectively; and a controller having an input terminal and an output terminal, the input terminal of the controller being coupled to the output terminal of the sensor, the output terminal of the controller controlling circuitry in the wireless communication device to operate in a first mode responsive to the first indication of the predetermined amount of change in the electromagnetic field and for controlling the circuitry to operate in a second mode responsive to the second indication of the predetermined amount of change in the electromagnetic field.

39. A wireless communication device adapted for communicating with a remote station comprising:

a signal generator for generating a forward signal;

a first radiator, coupled to the signal generator, for radiating the forward signal to produce an electromagnetic field near the first radiator, wherein the electromagnetic field changes by a predetermined amount responsive to the proximity of the first radiator to a predetermined object external to the wireless communication device including at least one of a portion of a human body, an element of a battery charger adapted to charge a battery of the wireless communication device, an element of a hang-up cup adapted to receive the wireless communication device, and an element of a portable holster adapted for carrving the wireless communication device;

a sensor, coupled to the first radiator, for providing first and second indications of the predetermined amount of change in the electromagnetic field corresponding to predetermined object being near to and far from the electromagnetic field, respectively; and a controller, coupled to the sensor, for controlling circuitry in the wireless communication device to operate in a first mode responsive to the first indication of the predetermined amount of change in the electromagnetic field and for controlling the circuitry to operate in a second mode responsive to the second indication of the predetermined amount of change in the electromagnetic field.

40. A wireless communication device according to claim 39 wherein the circuitry further comprises:

a tactile alert device; and an audible alert device, wherein the circuitry operates in the first mode by permitting a first one of the tactile alert device and the audible alert device to be activated and by not permitting a second one of the tactile alert device and the audible alert device to be activated, and wherein the circuitry operates in the second mode by not permitting the first one of the tactile alert device and the audible alert device to be activated and by permitting the second one of the tactile alert device and the audible alert device to be activated.

41. A wireless communication device according to claim 39 wherein the controller further adjust the sensitivity of the electromagnetic field of the first radiator.

42. A wireless communication device according to claim 39:

wherein the first radiator produces a reflected signal responsive to receiving the forward signal; and wherein the sensor provides the first and the second indications of the predetermined amount of change in the electromagnetic field responsive to at least one parameter of the forward signal and at least one parameter of the reflected signal.

43. A wireless communication device according to claim 42 wherein the sensor further comprises:

a signal sampler, coupled to the first radiator, for sampling the forward signal and the reflected signal to produce a forward sampled signal and a reflected sampled signal, respectively; and a signal detector, coupled to the signal sampler, for detecting the at least one parameter of the forward sampled signal and the at least one parameter of the reflected sampled signal to provide the first and the second indications of the predetermined amount of change in the electromagnetic field.

44. A wireless communication device according to claim 43 wherein the signal sampler further comprises:

a bi-directional coupler having a first port for sampling the forward signal and having a second port for sampling the reflected signal.

45. A wireless communication device according to claim 43 wherein the at least one parameter of the forward sampled signal and the at least one parameter of the reflected sampled signal each include magnitude and phase, the signal detector further comprises:

a forward magnitude detector for detecting the magnitude of the forward sampled signal;

a forward phase detector for detecting the phase of the forward sampled signal;

a reflected magnitude detector for detecting the magnitude of the reflected sampled signal; and a reflected phase detector for detecting the phase of the reflected sampled signal;

wherein the magnitude of the forward sampled signal, the phase of the forward sampled signal, the magnitude of the reflected sampled signal, and the phase of the reflected sampled signal provide the first and the second indications of the predetermined amount of change in the electromagnetic field.

46. A wireless communication device according to claim 39 wherein:

the signal generator is a radio frequency (RF) transmitter for generating the forward signal at a radio frequency;

the forward signal is a communication signal including at least one of a voice signal and a data signal; and the first radiator forms an antenna, coupled to the RF transmitter, for radiating the forward signal at the radio frequency to a remote radio frequency (RF) receiver adapted to receive the forward signal.

47. A wireless communication device according to claim 39 wherein:

the signal generator is a radio frequency (RF) transmitter for generating the forward signal;

the forward signal is a communication signal including at least one of a voice signal and a data signal; and the wireless communication device further comprises:

a second radiator forming an antenna, coupled to the RF transmitter, for radiating the forward signal at the radio frequency to communicate with a remote radio frequency (RF) receiver adapted to receive the forward signal.

48. A wireless communication device according to claim 47 further comprising:

a switch, coupled to the RF transmitter, the first radiator and the second radiator, for selectively coupling the RF transmitter to at least one of the first radiator and the second radiator.

49. A wireless communication device according to claim 39:

wherein the signal generator is a local oscillator for generating the forward signal at a predetermined frequency;

wherein the first radiator forms an antenna; and wherein the wireless communication device further comprises:

a radio frequency (RF) receiver, coupled to the local oscillator and the antenna, for receiving signals from the first radiator responsive to the predetermined frequency of the forward signal.

50. A wireless communication device according to claim 49 further comprising:

a switch, coupled to the local oscillator and the first radiator, for selectively coupling the local oscillator to the first radiator.

51. A wireless communication device according to claim 39:

wherein the signal generator is a local oscillator generating the forward signal at a predetermined frequency; and wherein the wireless communication device further comprises:

a second radiator forming an antenna; and a radio frequency (RF) receiver, coupled to the local oscillator, and the second radiator, for receiving signals from the second radiator responsive to the predetermined frequency of the forward signal.

52. A wireless communication device according to claim 51 further comprising:

a switch, coupled to the local oscillator, the first radiator and the second radiator, for selectively coupling the local oscillator to at least one of the first radiator and the second radiator.

53. A wireless communication device according to claim 39:

wherein the signal generator generates the forward signal at a first frequency at a first point in time and at a second frequency at a second point in time;

wherein the first radiator produces a reflected signal at the first frequency at the first point in time and at the second frequency at the second point in time responsive to receiving the forward signal generated at the first frequency at the first point in time and at the second frequency at the second point in time, respectively; and wherein the sensor provides each of the first and the second indications of the predetermined amount of change in the electromagnetic field responsive to the first frequency and the second frequency of the forward signal and the first frequency and the second frequency of the reflected signal.

54. A wireless communication device according to claim 53 wherein:

the forward signal is generated at the first frequency at the first point in time on a control channel; and the forward signal is generated at the second frequency at the second point in time on a voice channel.

55. A wireless communication device according to claim 39 further comprising:

a second radiator, coupled to the signal generator, for radiating the forward signal to produce an electromagnetic field, wherein the electromagnetic field changes by a predetermined amount responsive to the proximity of the second radiator to a predetermined object external to the wireless communication device;

wherein the sensor, coupled to the first radiator and the second radiator, provides first and second indications of the predetermined amount of change in the electromagnetic field of the first radiator and first and second indications of the predetermined amount of change in the electromagnetic field of the second radiator;

wherein the first and second indications of the predetermined amount of change in the electromagnetic field of the first radiator is responsive to a change in an electric field of the first radiator; and wherein the first and second indications of the predetermined amount of change in the electromagnetic field of the second radiator is responsive to a change in a magnetic field of the second radiator.

56. A wireless communication device according to claim 39 wherein the first and second indications of the predetermined amount of change in the electromagnetic field of each of the first radiator and the second radiator is desirable when it is inside a predetermined range of values and is undesirable when it is outside the predetermined range of values.

57. A wireless communication device adapted for communicating with a remote station comprising:

a signal generator for generating a forward signal, wherein the signal generator is a radio frequency (RF) transmitter for generating the forward signal at a radio frequency, and wherein the forward signal is a communication signal including at least one of a voice signal and a data signal;

a first radiator, coupled to the signal generator, for radiating the forward signal to produce an electromagnetic field near the first radiator, wherein the electromagnetic field changes by a predetermined amount responsive to the proximity of the first radiator to a predetermined object external to the wireless communication device;

a sensor, coupled to the first radiator, for providing an indication of the predetermined amount of change in the electromagnetic field; and a controller, coupled to the sensor, for controlling circuitry in the wireless communication device responsive to the indication of the predetermined amount of change in the electromagnetic field, wherein either:
  the first radiator forms an antenna, coupled to the RF transmitter, for radiating the forward signal at the radio frequency to a remote radio frequency (RF) receiver adapted to receive the forward signal, or wherein the wireless communication device further comprises:
  a second radiator forming an antenna, coupled to the RF transmitter, for radiating the forward signal at the radio frequency to communicate with a remote radio frequency (RF) receiver adapted to receive the forward signal.

58. A wireless communication device according to claim 57:

wherein the first radiator produces a reflected signal responsive to receiving the forward signal; and wherein the sensor provides the indication of the predetermined amount of change in the electromagnetic field responsive to at least one parameter of the forward signal and at least one parameter of the reflected signal.

59. A wireless communication device according to claim 58 wherein the sensor further comprises:

a signal sampler, coupled to one of the first radiator and the second radiator, for sampling the forward signal and the reflected signal to produce a forward sampled signal and a reflected sampled signal, respectively; and a signal detector, coupled to the signal sampler, for detecting the at least one parameter of the forward sampled signal and the at least one parameter of the reflected sampled signal to provide the indication of the predetermined amount of change in the electromagnetic field.

60. A wireless communication device according to claim 59 wherein the signal sampler further comprises:

a bi-directional coupler having a first port for sampling the forward signal and having a second port for sampling the reflected signal.

61. A wireless communication device according to claim 59 wherein the at least one parameter of the forward sampled signal and the at least one parameter of the reflected sampled signal each incude magnitude and phase, the signal detector further comprises:

a forward magnitude detector for detecting the magnitude of the forward sampled signal;

a forward phase detector for detecting the phase of the forward sampled signal;

a reflected magnitude detector for detecting the magnitude of the reflected sampled signal; and a reflected phase detector for detecting the phase of the reflected sampled signal;

wherein the magnitude of the forward sampled signal, the phase of the forward sampled signal, the magnitude of the reflected sampled signal, and the phase of the reflected sampled signal provide the indication of the predetermined amount of change in the electromagnetic field.

62. A wireless communication device according to claim 57 further comprising:

a switch, coupled to the RF transmitter, the first radiator and the second radiator, for selectively coupling the RF transmitter to at least one of the first radiator and the second radiator when the wireless communication device comprises the second radiator forming the antenna.

63. A wireless communication device according to claim 57:

wherein the signal generator generates the forward signal at a first frequency at a first point in time and at a second frequency at a second point in time;

wherein one of the first radiator and the second radiator produces a reflected signal at the first frequency at the first point in time and at the second frequency at the second point in time responsive to receiving the forward signal generated at the first frequency at the first point in time and at the second frequency at the second point in time, respectively; and wherein the sensor provides the indication of the predetermined amount of change in the electromagnetic field responsive to the first frequency and the second frequency of the forward signal and the first frequency and the second frequency of the reflected signal.

64. A wireless communication device according to claim 63 wherein:

the forward signal is generated at the first frequency at the first point in time on a control channel; and the forward signal is generated at the second frequency at the second point in time on a voice channel.

65. A wireless communication device according to claim 57 further comprising:

a third radiator, coupled to the signal generator, for radiating the forward signal to produce an electromagnetic field, wherein the electromagnetic field changes by a predetermined amount responsive to the proximity of the second radiator to a predetermined object external to the wireless communication device;

wherein the sensor, coupled to one of the first radiator and the second radiator and coupled to the third radiator, provides an indication of the predetermined amount of change in the electromagnetic field of one of the first radiator and the second radiator and an indication of the predetermined amount of change in the electromagnetic field of the third radiator;

wherein the indication of the predetermined amount of change in the electromagnetic field of one of the first radiator and the second radiator is responsive to a change in an electric field of one of the first radiator and the second radiator; and wherein the indication of the predetermined amount of change in the electromagnetic field of the third radiator is responsive to a change in a magnetic field of the third radiator.

66. A wireless communication device according to claim 57 wherein the predetermined object external to the wireless communication device is a portion of a human body.

67. A wireless communication device according to claim 57 wherein the predetermined object external to the wireless communication device is an element of a battery charger adapted to charge a battery of the wireless communication device.

68. A wireless communication device according to claim 57 wherein the predetermined object external to the wireless communication device is an element of a hang-up cup adapted to receive the wireless communication device.

69. A wireless communication device according to claim 57 wherein the predetermined object external to the wireless communication device is an element of a portable holster adapted for carrying the wireless communication device.

70. A wireless communication device according to claim 57 wherein the indication of the predetermined amount of change in the electromagnetic field is desirable when it is inside a predetermiined range of values and is undesirable when it is outside the predetermined range of values.

71. A wireless communication device adapted for communicating with a remote station comprising:

a signal generator for generating a forward signal, wherein the signal generator is a local oscillator for generating the forward signal at a predetermined frequency;

a first radiator, coupled to the signal generator, for radiating the forward signal to produce an electromagnetic field near the first radiator, wherein the electromagnetic field changes by a predetermined amount responsive to the proximity of the first radiator to a predetermined object external to the wireless communication device;

a sensor, coupled to the first radiator, for providing an indication of the predetermined amount of change in the electromagnetic field;

a controller, coupled to the sensor, for controlling circuitry in the wireless communication device responsive to the indication of the predetermined amount of change in the electromagnetic field, and a radio frequency (RF) receiver, coupled to the local oscillator and one of the first radiator and a second radiator, for receiving signals from one of the first radiator and the second radiator, respectively, responsive to the predetermined frequency of the forward signal, wherein either:
the first radiator forms an antenna, or
wherein the wireless commnunication device further comprises:
the second radiator forming an antenna.

72. A wireless communication device according to claim 71:

wherein the first radiator produces a reflected signal responsive to receiving the forward signal; and wherein the sensor provides the indication of the predetermined amount of change in the electromagnetic field responsive to at least one parameter of the forward signal and at least one parameter of the reflected signal.

73. A wireless communication device according to claim 72 wherein the sensor further comprises:

a signal sampler, coupled to one of the first radiator and the second radiator, for sampling the forward signal and the reflected signal to produce a forward sampled signal and a reflected sampled signal, respectively; and a signal detector, coupled to the signal sampler, for detecting the at least one parameter of the forward sampled signal and the at least one parameter of the reflected sampled signal to provide the indication of the predetermined amount of change in the electromagnetic field.

74. A wireless communication device according to claim 73 wherein the signal sampler further comprises:

a bi-directional coupler having a first port for sampling the forward signal and having a second port for sampling the reflected signal.

75. A wireless communication device according to claim 73 wherein the at least one parameter of the forward sampled signal and the at least one parameter of the reflected sampled signal each incude magnitude and phase, the signal detector further comprises:

a forward magnitude detector for detecting the magnitude of the forward sampled signal;

a forward phase detector for detecting the phase of the forward sampled signal;

a reflected magnitude detector for detecting the magnitude of the reflected sampled signal; and a reflected phase detector for detecting the phase of the reflected sampled signal;

wherein the magnitude of the forward sampled signal, the phase of the forward sampled signal, the magnitude of the reflected sampled signal, and the phase of the reflected sampled signal provide the indication of the predetermined amount of change in the electromagnetic field.

76. A wireless communication device according to claim 71 further comprising:

a switch, coupled to the local oscillator and the first radiator, for selectively coupling the local oscillator to the first radiator when the first radiator forms the antenna.

77. A wireless communication device according to claim 71 further comprising:

a switch, coupled to the local oscillator, the second radiator, for selectively coupling the local oscillator to the second radiator when the wireless communication device comprises the second radiator forming the antenna.

78. A wireless communication device according to claim 71:

wherein the signal generator generates the forward signal at a first frequency at a first point in time and at a second frequency at a second point in time;

wherein one of the first radiator and the second radiator produces a reflected signal at the first frequency at the first point in time and at the second frequency at the second point in time responsive to receiving the forward signal generated at the first frequency at the first point in time and at the second frequency at the second point in time, respectively; and wherein the sensor provides the indication of the predetermined amount of change in the electromagnetic field responsive to the first frequency and the second frequency of the forward signal and the first frequency and the second frequency of the reflected signal.

79. A wireless communication device according to claim 78 wherein:

the forward signal is generated at the first frequency at the first point in time on a control channel; and the forward signal is generated at the second frequency at the second point in time on a voice channel.

80. A wireless communication device according to claim 71:

wherein the sensor, coupled to one of the first radiator and the second radiator and coupled to the third radiator, provides an indication of the predetermined amount of change in the electromagnetic field of one of the first radiator and the second radiator and an indication of the predetermined amount of change in the electromagnetic field of the third radiator;

wherein the indication of the predetermined amount of change in the electromagnetic field of one of the first radiator and the second radiator is responsive to a change in an electric field of one of the first radiator and the second radiator; and wherein the indication of the predetermined amount of change in the electromagnetic field of the third radiator is responsive to a change in a magnetic field of the third radiator.

81. A wireless communication device according to claim 71 wherein the predetermined object external to the wireless communication device is a portion of a human body.

82. A wireless communication device according to claim 71 wherein the predetermined object external to the wireless communication device is an element of a battery charger adapted to charge a battery of the wireless communication device.

83. A wireless communication device according to claim 71 wherein the predetermined object external to the wireless communication device is an element of a hang-up cup adapted to receive the wireless communication device.

84. A wireless communication device according to claim 71 wherein the predetermnined object external to the wireless communication device is an element of a portable holster adapted for carrying the wireless communication device.

85. A wireless communication device according to claim 71 wherein the indication of the predetermined amount of change in the electromagnetic field is desirable when it is inside a predetermined range of values and is undesirable when it is outside the predetermined range of values.

86. A wireless communication device adapted for communicating with a remote station comprising:

a signal generator for generating a forward signal, wherein the signal generator generates the forward signal at a first frequency at a first point in time and at a second frequency at a second point in time;

a first radiator, coupled to the signal generator, for radiating the forward signal to produce an electromagnetic field near the first radiator, wherein the electromagnetic field changes by a predetermined amount responsive to the proximity of the first radiator to a predetermined object external to the wireless communication device, wherein the first radiator produces a reflected signal at the first frequency at the first point in time and at the second frequency at the second point in time responsive to receiving the forward signal generated at the first frequency at the first point in time and at the second frequency at the second point in time, respectively;

a sensor, coupled to the first radiator, for providing an indication of the predetermined amount of change in the electromagnetic field, wherein the sensor provides the indication of the predetermined amount of change in the electromagnetic field responsive to the first frequency and the second frequency of the forward signal and the first frequency and the second frequency of the reflected signal; and a controller, coupled to the sensor, for controlling circuitry in the wireless communication device responsive to the indication of the predetermined amount of change in the electromagnetic field.

87. A wireless communication device according to claim 86:

wherein the first radiator produces a reflected signal responsive to receiving the forward signal; and wherein the sensor provides the indication of the predetermined amount of change in the electromagnetic field responsive to at least one parameter of the forward signal and at least one parameter of the reflected signal.

88. A wireless communication device according to claim 87 wherein the sensor further comprises:

a signal sampler, coupled to the first radiator, for sampling the forward signal and the reflected signal to produce a forward sampled signal and a reflected sampled signal, respectively; and a signal detector, coupled to the signal sampler, for detecting the at least one parameter of the forward sampled signal and the at least one parameter of the reflected sampled signal to provide the indication of the predetermined amount of change in the electromagnetic field.

89. A wireless communication device according to claim 88 wherein the signal sampler further comprises:

a bi-directional coupler having a first port for sampling the forward signal and having a second port for sampling the reflected signal.

90. A wireless communication device according to claim 88 wherein the at least one parameter of the forward sampled signal and the at least one parameter of the reflected sampled signal each incude magnitude and phase, the signal detector further comprises:

a forward magnitude detector for detecting the magnitude of the forward sampled signal;

a forward phase detector for detecting the phase of the forward sampled signal;

a reflected magnitude detector for detecting the magnitude of the reflected sampled signal; and a reflected phase detector for detecting the phase of the reflected sampled signal;

wherein the magnitude of the forward sampled signal, the phase of the forward sampled signal, the magnitude of the reflected sampled signal, and the phase of the reflected sampled signal provide the indication of the predetermined amount of change in the electromagnetic field.

91. A wireless communication device according to claim 86 wherein:

the signal generator is a radio frequency (RF) transmitter for generating the forward signal at a radio frequency;

the forward signal is a communication signal including at least one of a voice signal and a data signal; and the first radiator forms an antenna, coupled to the RF transmitter, for radiating the forward signal at the radio frequency to a remote radio frequency (RF) receiver adapted to receive the forward signal.

92. A wireless communication device according to claim 86 wherein:

the signal generator is a radio frequency (RF) transmitter for generating the forward signal;

the forward signal is a communication signal including at least one of a voice signal and a data signal; and the wireless communication device further comprises:

a second radiator forming an antenna, coupled to the RF transmitter, for radiating the forward signal at the radio frequency to communicate with a remote radio frequency (RF) receiver adapted to receive the forward signal.

93. A wireless communication device according to claim 92 further comprising:

a switch, coupled to the RF transmitter, the first radiator and the second radiator, for selectively coupling the RF transmitter to at least one of the first radiator and the second radiator.

94. A wireless communication device according to claim 86:

wherein the signal generator is a local oscillator for generating the forward signal at a predetermined frequency;

wherein the first radiator forms an antenna; and wherein the wireless communication device further comprises:

a radio frequency (RF) receiver, coupled to the local oscillator and the antenna, for receiving signals from the first radiator responsive to the predetermined frequency of the forward signal.

95. A wireless communication device according to claim 94 further comprising:

a switch, coupled to the local oscillator and the first radiator, for selectively coupling the local oscillator to the first radiator.

96. A wireless communication device according to claim 86:

wherein the signal generator is a local oscillator generating the forward signal at a predetermined frequency; and wherein the wireless communication device further comprises:

a second radiator forming an antenna; and a radio frequency (RF) receiver, coupled to the local oscillator, and the second radiator, for receiving signals from the second radiator responsive to the predetermined frequency of the forward signal.

97. A wireless communication device according to claim 96 further comprising:

a switch, coupled to the local oscillator, the first radiator and the second radiator, for selectively coupling the local oscillator to at least one of the first radiator and the second radiator.

98. A wireless communication device according to claim 86 wherein:

the forward signal is generated at the first frequency at the first point in time on a control channel; and the forward signal is generated at the second frequency at the second point in time on a voice channel.

99. A wireless communication device according to claim 86 wherein the predetermined object external to the wireless communication device is a portion of a human body.

100. A wireless communication device according to claim 86 wherein the predetermined object external to the wireless communication device is an element of a battery charger adapted to charge a battery of the wireless communication device.

101. A wireless comnnunication device according to claim 86 wherein the predetermined object external to the wireless communication device is an element of a hang-up cup adapted to receive the wireless communication device.

102. A wireless communication device according to claim 86 wherein the predetermined object external to the wireless communication device is an element of a portable holster adapted for carrying the wireless communication device.

103. A wireless communication device according to claim 86 wherein the indication of the predetermined amount of change in the electromagnetic field is desirable when it is inside a predetermined range of values and is undesirable when it is outside the predetermined range of values.

104. A wireless communication device adapted for communicating with a remote station comprising:

a signal generator for generating a forward signal;

a first radiator, coupled to the signal generator, for radiating the forward signal to produce an electromagnetic field near the first radiator, wherein the electromagnetic field changes by a predetermined amount responsive to the proximity of the first radiator to a predetermined object external to the wireless communication device;

a second radiator, coupled to the signal generator, for radiating the forward signal to produce an electromagnetic field, wherein the electromagnetic field changes by a predetermined amount responsive to the proximity of the second radiator to a predetermined object external to the wireless communication device;

a sensor, coupled to the first radiator and the second radiator, for providing an indication of the predetermined amount of change in the electromagnetic field of the first radiator responsive to a change in an electric field of the first radiator and providing an indication of the predetermined amount of change in the electromagnetic field of the second radiator responsive to a change in a magnetic field of the second radiator; and a controller, coupled to the sensor, for controlling circuitry in the wireless communication device responsive to the indication of the predetermined amount of change in the electromagnetic field of the first radiator and the indication of the predetermined amount of change in the electromagnetic field of the second radiator.

105. A wireless communication device according to claim 104:

wherein the first radiator produces a reflected signal responsive to receiving the forward signal; and wherein the sensor provides the indication of the predetermined amount of change in the electromagnetic field responsive to at least one parameter of the forward signal and at least one parameter of the reflected signal.

106. A wireless communication device according to claim 105 wherein the sensor further comprises:

a signal sampler, coupled to the first radiator, for sampling the forward signal and the reflected signal to produce a forward sampled signal and a reflected sampled signal, respectively; and a signal detector, coupled to the signal sampler, for detecting the at least one parameter of the forward sampled signal and the at least one parameter of the reflected sampled signal to provide the indication of the predetermined amount of change in the electromagnetic field.

107. A wireless communication device according to claim 106 wherein the signal sampler further comprises:

a bi-directional coupler having a first port for sampling the forward signal and having a second port for sampling the reflected signal.

108. A wireless communication device according to claim 106 wherein the at least one parameter of the forward sampled signal and the at least one parameter of the reflected sampled signal each incude magnitude and phase, the signal detector further comprises:

a forward magnitude detector for detecting the magnitude of the forward sampled signal;

a forward phase detector for detecting the phase of the forward sampled signal;

a reflected magnitude detector for detecting the magnitude of the reflected sampled signal; and a reflected phase detector for detecting the phase of the reflected sampled signal;

wherein the magnitude of the forward sampled signal, the phase of the forward sampled signal, the magnitude of the reflected sampled signal, and the phase of the reflected sampled signal provide the indication of the predetermined amount of change in the electromagnetic field.

109. A wireless communication device according to claim 104 wherein:

the signal generator is a radio frequency (RF) transmitter for generating the forward signal at a radio frequency;

the forward signal is a communication signal including at least one of a voice signal and a data signal; and the first radiator forms an antenna, coupled to the RF transmitter, for radiating the forward signal at the radio frequency to a remote radio frequency (RF) receiver adapted to receive the forward signal.

110. A wireless communication device according to claim 104 wherein:

the signal generator is a radio frequency (RF) transmitter for generating the forward signal;

the forward signal is a communication signal including at least one of a voice signal and a data signal; and the wireless communication device further comprises:

a second radiator forming an antenna, coupled to the RF transmitter, for radiating the forward signal at the radio frequency to communicate with a remote radio frequency (RF) receiver adapted to receive the forward signal.

111. A wireless communication device according to claim 110 further comprising:

a switch, coupled to the RF transmitter, the first radiator and the second radiator, for selectively coupling the RF transmitter to at least one of the first radiator and the second radiator.

112. A wireless communication device according to claim 104:

wherein the signal generator is a local oscillator for generating the forward signal at a predetermined frequency;

wherein the first radiator forms an antenna; and wherein the wireless communication device further comprises:

a radio frequency (RF) receiver, coupled to the local oscillator and the antenna, for receiving signals from the first radiator responsive to the predetermined frequency of the forward signal.

113. A wireless communication device according to claim 112 further comprising:

a switch, coupled to the local oscillator and the first radiator, for selectively coupling the local oscillator to the first radiator.

114. A wireless communication device according to claim 104:

wherein the signal generator is a local oscillator generating the forward signal at a predetermined frequency; and wherein the wireless communication device further comprises:

a second radiator forming an antenna; and a radio frequency (RF) receiver, coupled to the local oscillator, and the second radiator, for receiving signals from the second radiator responsive to the predetermined frequency of the forward signal.

115. A wireless communication device according to claim 114 further comprising:

a switch, coupled to the local oscillator, the first radiator and the second radiator, for selectively coupling the local oscillator to at least one of the first radiator and the second radiator.

116. A wireless communication device according to claim 104 wherein the predetermined object external to the wireless communication device is a portion of a human body.

117. A wireless communication device according to claim 104 wherein the predetermined object external to the wireless communication device is an element of a battery charger adapted to charge a battery of the wireless communication device.

118. A wireless communication device according to claim 104 wherein the predetermined object external to the wireless communication device is an element of a hang-up cup adapted to receive the wireless communication device.

119. A wireless communication device according to claim 104 wherein the predetermined object external to the wireless communication device is an element of a portable holster adapted for carrying the wireless communication device.

120. A wireless communication device according to claim 104 wherein the indication of the predetermined amount of change in the electromagnetic field is desirable when it is inside a predeternined range of values and is undesirable when it is outside the predetermined range of values.

121. A wireless communication device adapted for communicating with a remote station comprising:

a signal generator for generating a forward signal;

a first radiator, coupled to the signal generator, for radiating the forward signal to produce an electromagnetic field near the first radiator, wherein the electromagnetic field changes by a predetermined amnount responsive to the proximity of the first radiator to a predetermined object external to the wireless communication device, wherein the predetermined object external to the wireless communication device is an element of a battery charger adapted to charge a battery of the wireless communication device;

a sensor, coupled to the first radiator, for providing an indication of the predetermined amount of change in the electromagnetic field; and a controller, coupled to the sensor, for controlling circuitry in the wireless communication device responsive to the indication of the predetermined amount of change in the electromagnetic field.

122. A wireless communication device adapted for communicating with a remote station comprising:

a signal generator for generating a forward signal;

a first radiator, coupled to the signal generator, for radiating the forward signal to produce an electromagnetic field near the first radiator, wherein the electromagnetic field changes by a predetermined amount responsive to the proximity of the first radiator to a predetermined object external to the wireless communication device, wherein the predetermined object external to the wireless communication device is an element of a hang-up cup adapted to receive the wireless communication device;

a sensor, coupled to the first radiator, for providing an indication of the predetermined amount of change in the electromagnetic field; and a controller, coupled to the sensor, for controlling circuitry in the wireless communication device responsive to the indication of the predetermined amount of change in the electromagnetic field.

123. A wireless communication device adapted for communicating with a remote station comprising:

a signal generator for generating a forward signal;

a first radiator, coupled to the signal generator, for radiating the forward signal to produce an electromagnetic field near the first radiator, wherein the electromagnetic field changes by a predetermined amount responsive to the proximity of the first radiator to a predetermined object external to the wireless communication device, wherein the predetermined object external to the wireless communication device is an element of a portable holster adapted for carrying the wireless communication device;

a sensor, coupled to the first radiator, for providing an indication of the predetermined amount of change in the electromagnetic field; and a controller, coupled to the sensor, for controlling circuitry in the wireless communication device responsive to the indication of the predetermined amount of change in the electromagnetic field.

* * * * *

UNITED STATES PATENT AND TRADEMARK OFFICE
CERTIFICATE OF CORRECTION

PATENT NO.  :  5,956,626
DATED       :  September 21, 1999
INVENTOR(S) :  Kaschke et al.

It is certified that error appears in the above-indentified patent and that said Letters Patent is hereby corrected as shown below:

Please correct the spelling of the word "include" in column 28, line 25, and in column 30, line 45.

Signed and Sealed this

Fourth Day of April, 2000

Attest:

Q. TODD DICKINSON

Attesting Officer

Director of Patents and Trademarks